(12) United States Patent
Burns et al.

(10) Patent No.: US 8,936,661 B2
(45) Date of Patent: Jan. 20, 2015

(54) MULTI-STAGE FILTER ELEMENT

(75) Inventors: David J. Burns, Mineral Wells, TX (US); Daniel M. Cloud, Weatherford, TX (US); Artimus Charles Jones, Mineral Wells, TX (US); Tyler Glenn Boswell, Weatherford, TX (US)

(73) Assignee: PECOFacet (US), Inc., Franklin, TN (US)

( * ) Notice: Subject to any disclaimer, the term of this patent is extended or adjusted under 35 U.S.C. 154(b) by 519 days.

(21) Appl. No.: 13/033,105

(22) Filed: Feb. 23, 2011

(65) Prior Publication Data

US 2012/0210688 A1    Aug. 23, 2012

(51) Int. Cl.
*B01D 46/00* (2006.01)
*B01D 46/24* (2006.01)
*B01D 46/52* (2006.01)

(52) U.S. Cl.
CPC ........ *B01D 46/2403* (2013.01); *B01D 46/2414* (2013.01); *B01D 46/0023* (2013.01); *B01D 46/002* (2013.01); *B01D 46/0024* (2013.01); *B01D 46/2411* (2013.01); *B01D 46/521* (2013.01); *B01D 2271/027* (2013.01)
USPC .................. 55/482; 55/320; 55/323; 55/484; 55/485; 55/486; 55/487; 55/488; 55/498; 55/502

(58) Field of Classification Search
CPC ............. B01D 46/002; B01D 46/0021; B01D 46/0023; B01D 46/0024; B01D 46/24; B01D 46/2411; B01D 46/2414; B01D 2271/027
USPC ........... 55/318, 319, 320, 324, 482, 484, 486, 55/487, 488, 498, 502, 323, 485
See application file for complete search history.

(56) References Cited

U.S. PATENT DOCUMENTS

| 3,847,577 | A | * | 11/1974 | Hansen | 55/385.3 |
| 4,256,474 | A | * | 3/1981 | Berger et al. | 96/152 |
| 4,838,903 | A | * | 6/1989 | Thomaides et al. | 95/286 |
| 5,151,180 | A | | 9/1992 | Giordano et al. | |
| 5,415,676 | A | * | 5/1995 | Tokar et al. | 55/318 |
| 5,443,724 | A | | 8/1995 | Williamson et al. | |
| 5,454,858 | A | * | 10/1995 | Tokar et al. | 95/285 |
| 5,800,584 | A | * | 9/1998 | Hinderer et al. | 55/482 |
| 5,827,430 | A | | 10/1998 | Perry, Jr. et al. | |
| 5,858,044 | A | * | 1/1999 | Nepsund et al. | 55/486 |
| 5,871,557 | A | * | 2/1999 | Tokar et al. | 55/472 |
| 5,893,956 | A | | 4/1999 | Perry, Jr. et al. | |
| 5,919,284 | A | | 7/1999 | Perry, Jr. et al. | |
| 5,935,284 | A | * | 8/1999 | Tokar et al. | 55/485 |
| 6,007,608 | A | * | 12/1999 | Johnson | 95/287 |
| 6,015,452 | A | * | 1/2000 | Nepsund et al. | 95/287 |
| 6,168,647 | B1 | | 1/2001 | Perry, Jr. et al. | |
| 7,108,738 | B2 | | 9/2006 | Burns et al. | |
| 2010/0224065 | A1 | | 9/2010 | Clarke et al. | |

OTHER PUBLICATIONS

Pictures of a Filter Element (some pictures showing the element disassembled) believe to be used in Gemini vessels, and believed to be prior art; known at least as early as Dec. 8, 2010; six pages.

\* cited by examiner

*Primary Examiner* — Robert Clemente
(74) *Attorney, Agent, or Firm* — Reinhart Boerner Van Deuren P.C.

(57) ABSTRACT

Multi-stage filtration apparatus is provided. A fluid is forced through different filter stage elements allowing for removal of various contaminants from the fluid.

22 Claims, 13 Drawing Sheets

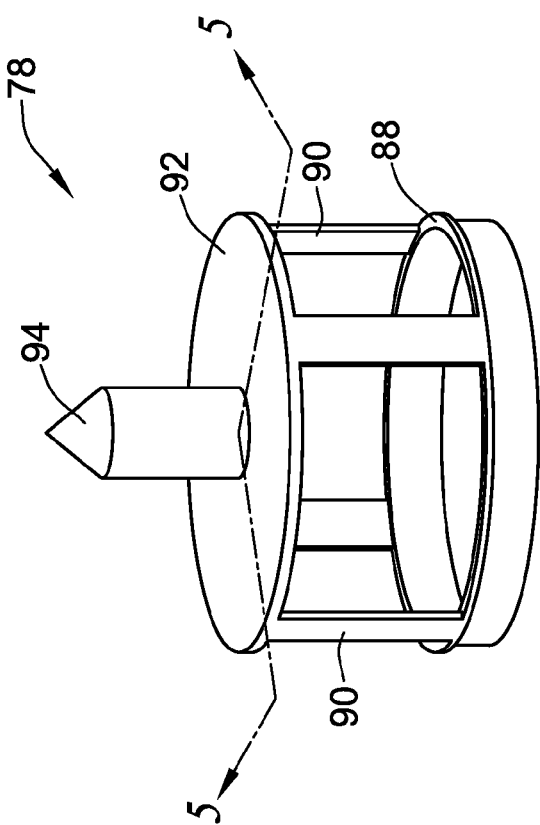
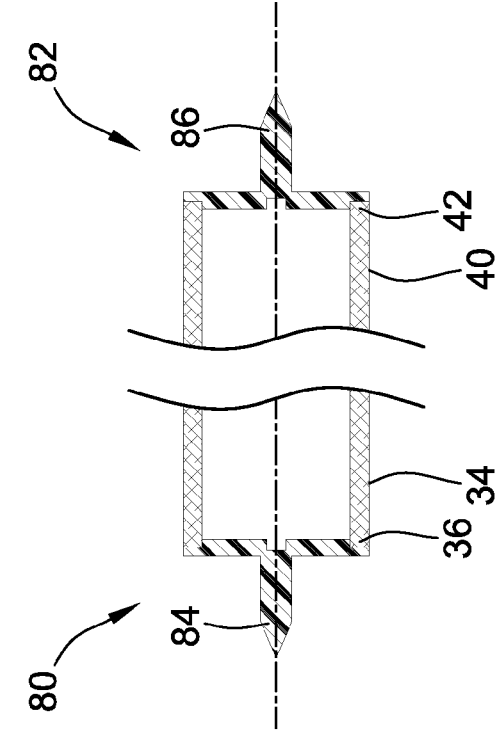
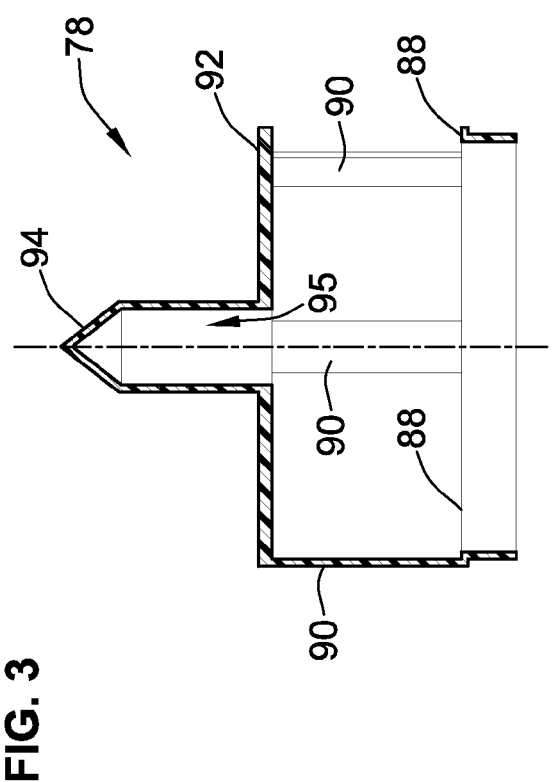
FIG. 4
FIG. 3
FIG. 5

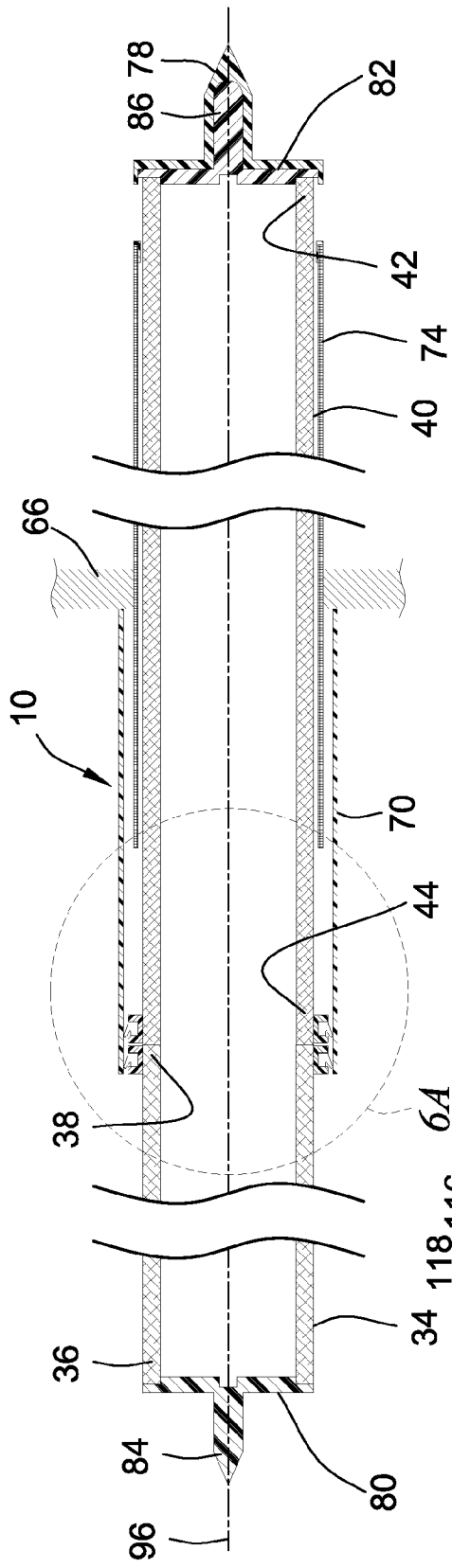
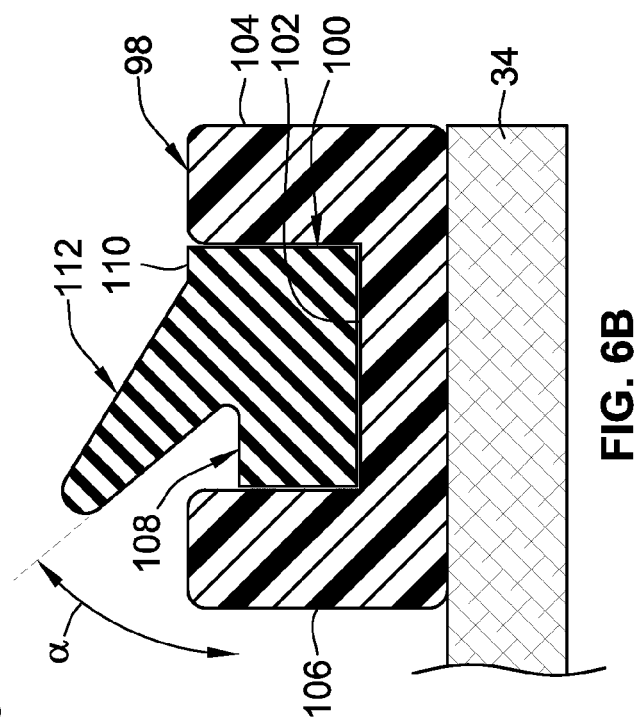
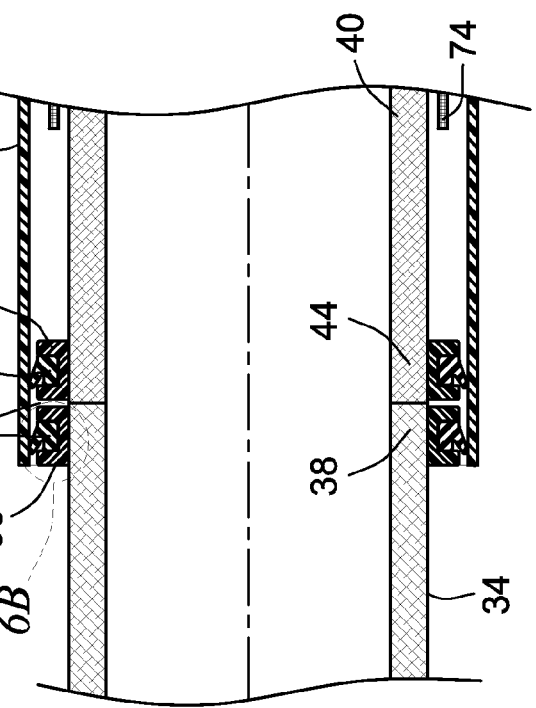

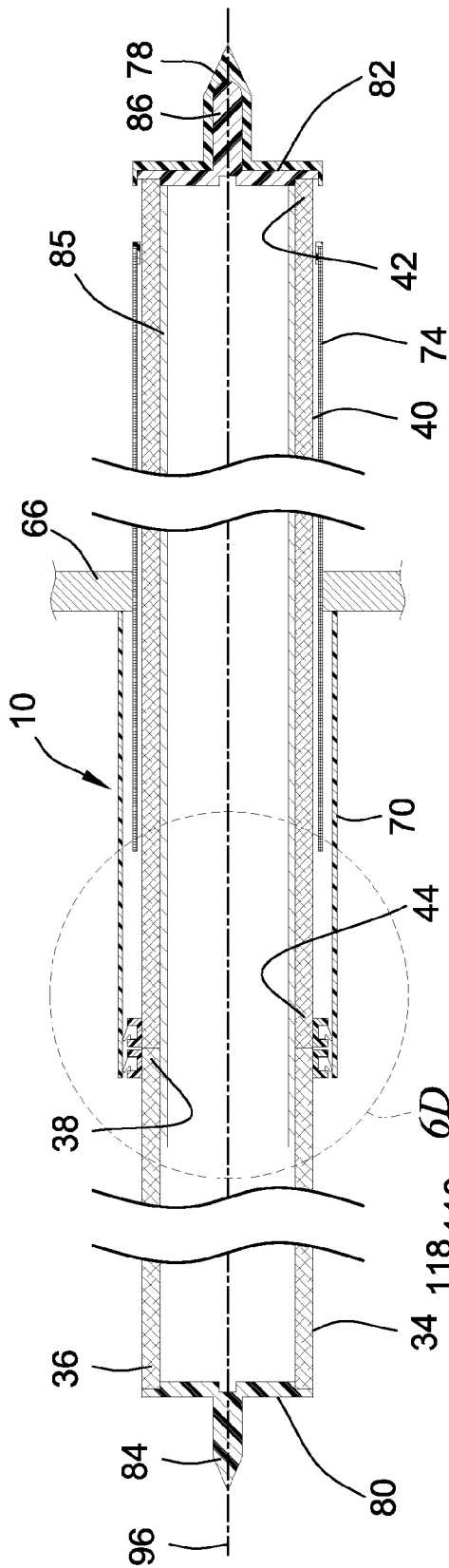
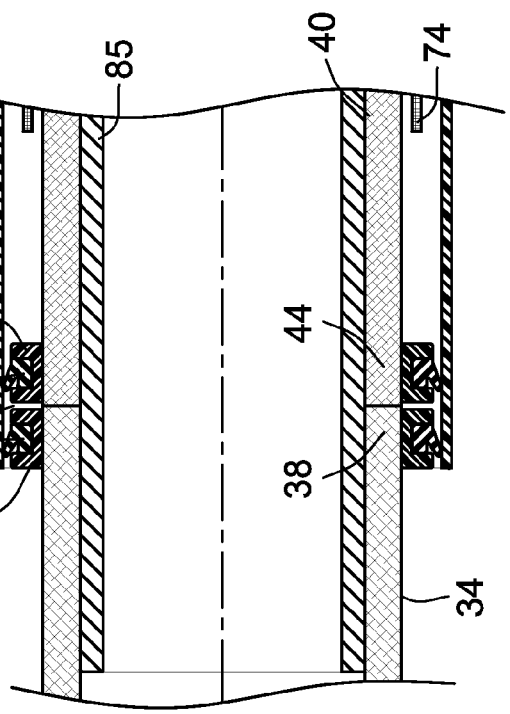
FIG. 6C
FIG. 6D

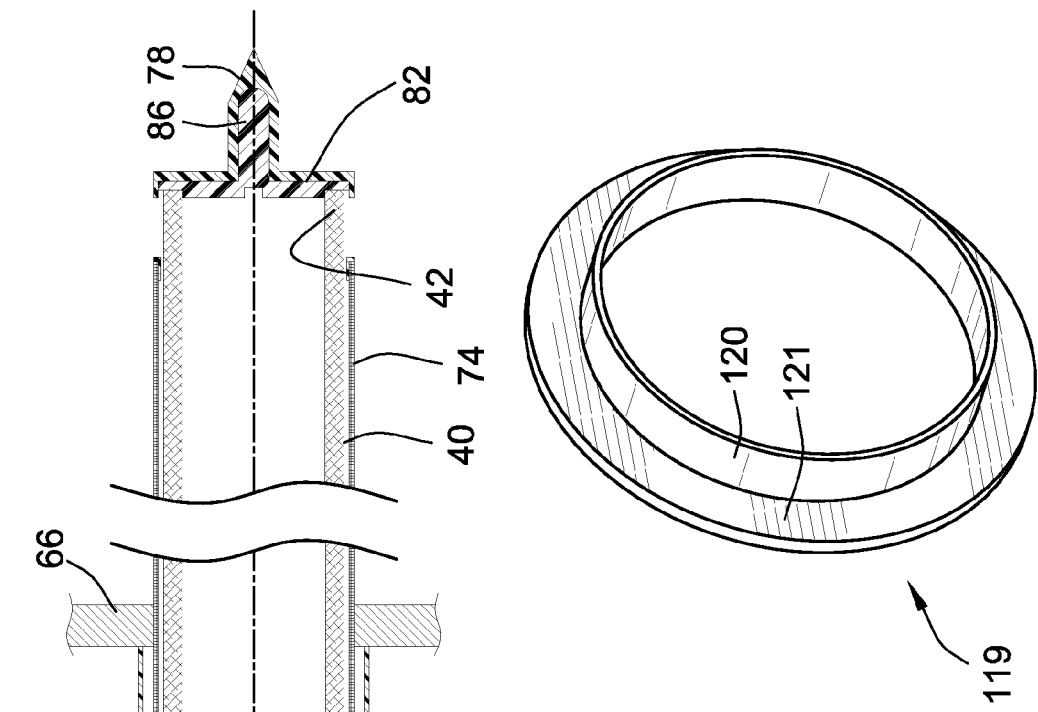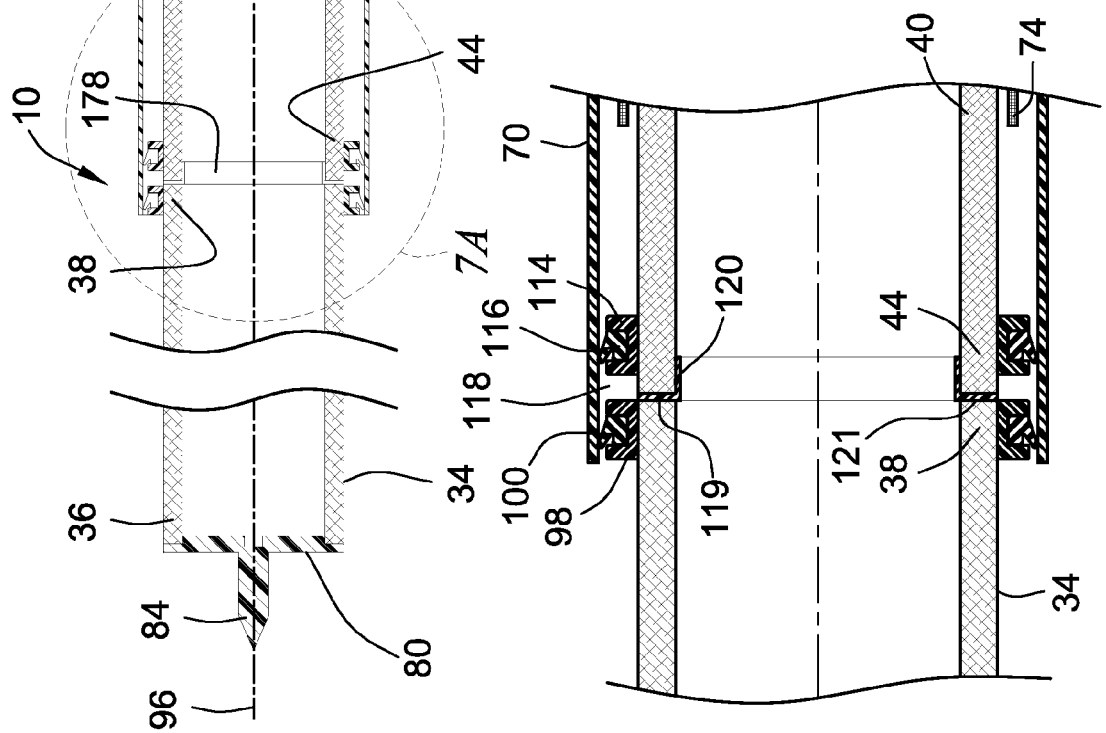

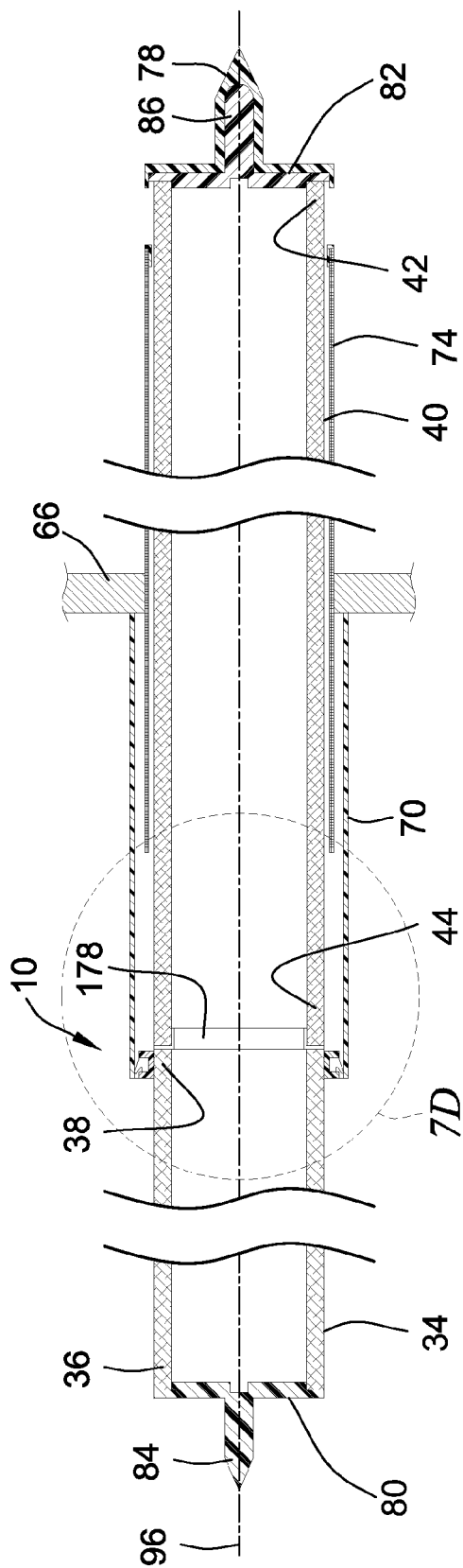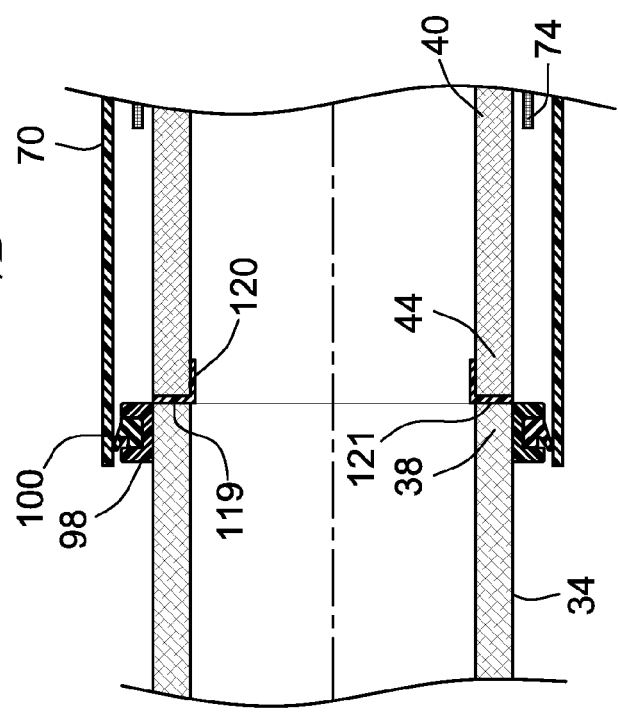

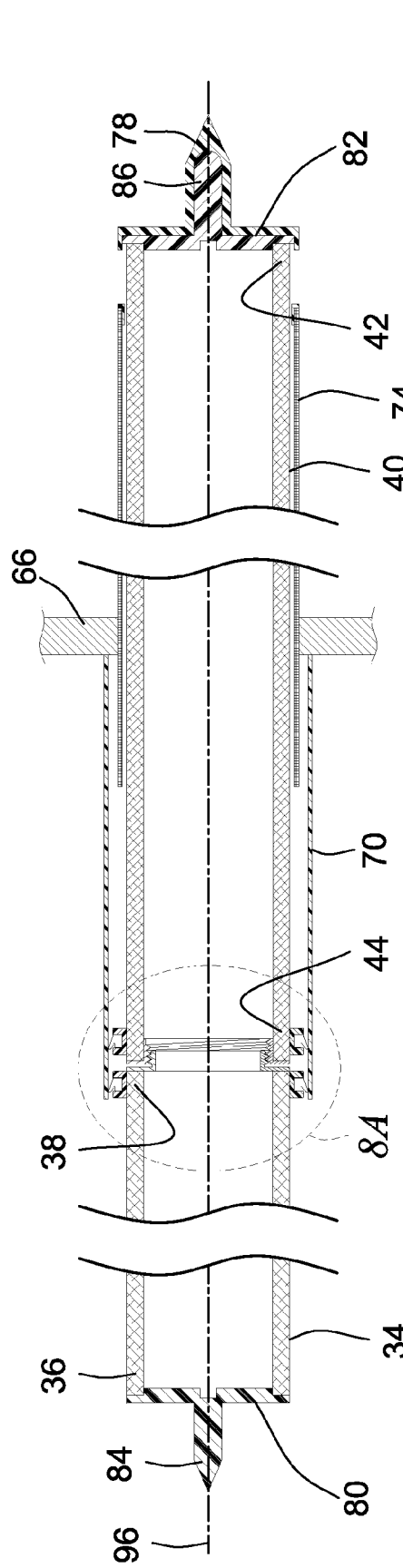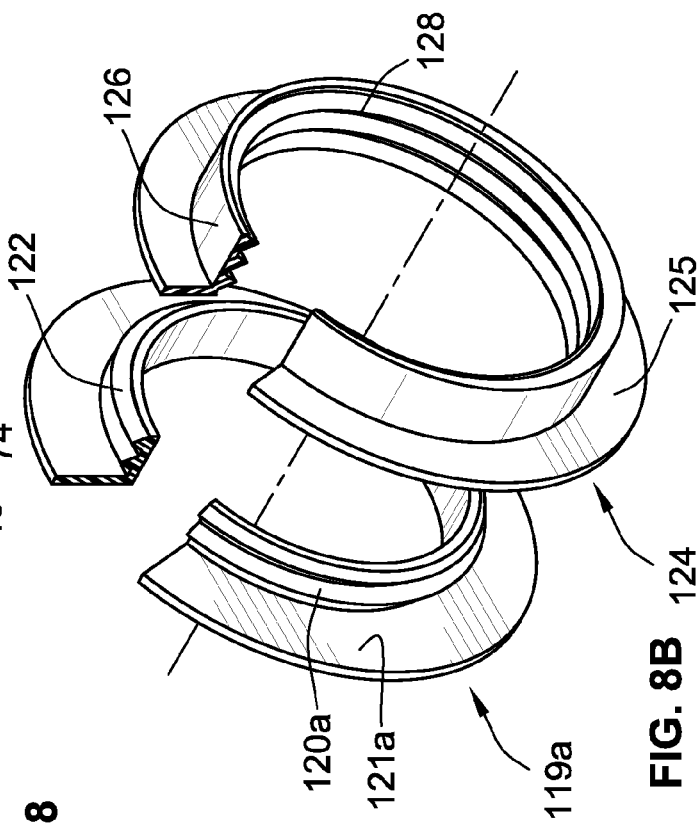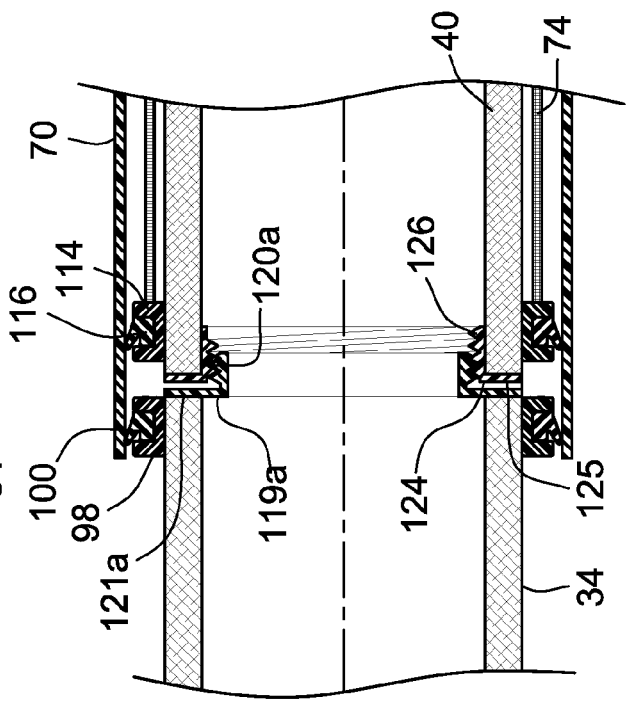
FIG. 8
FIG. 8B
FIG. 8A

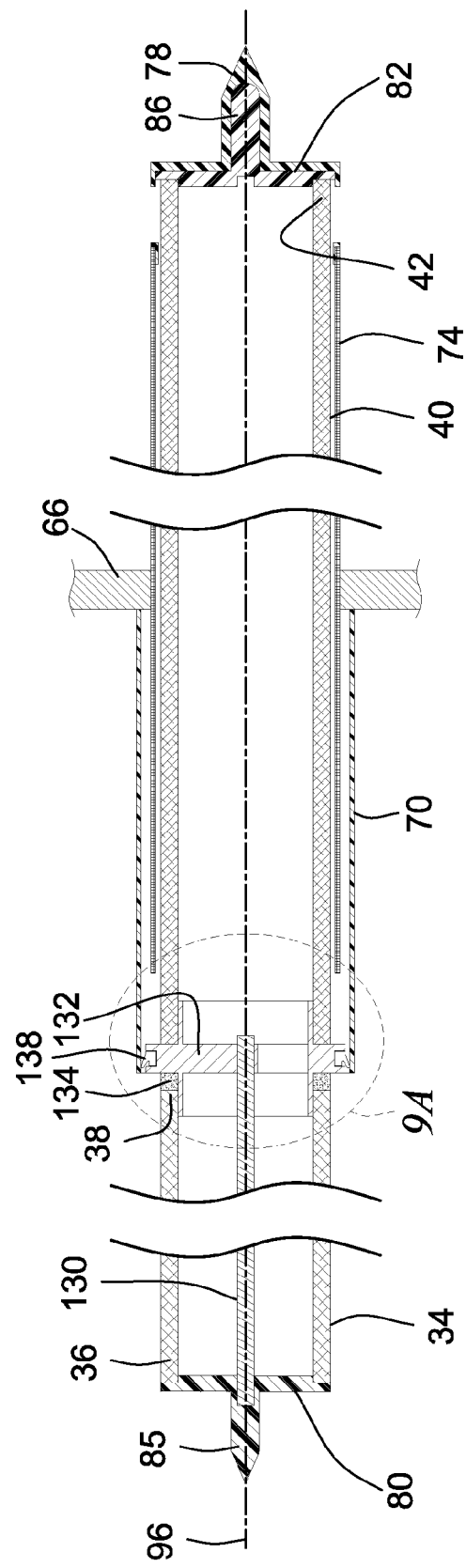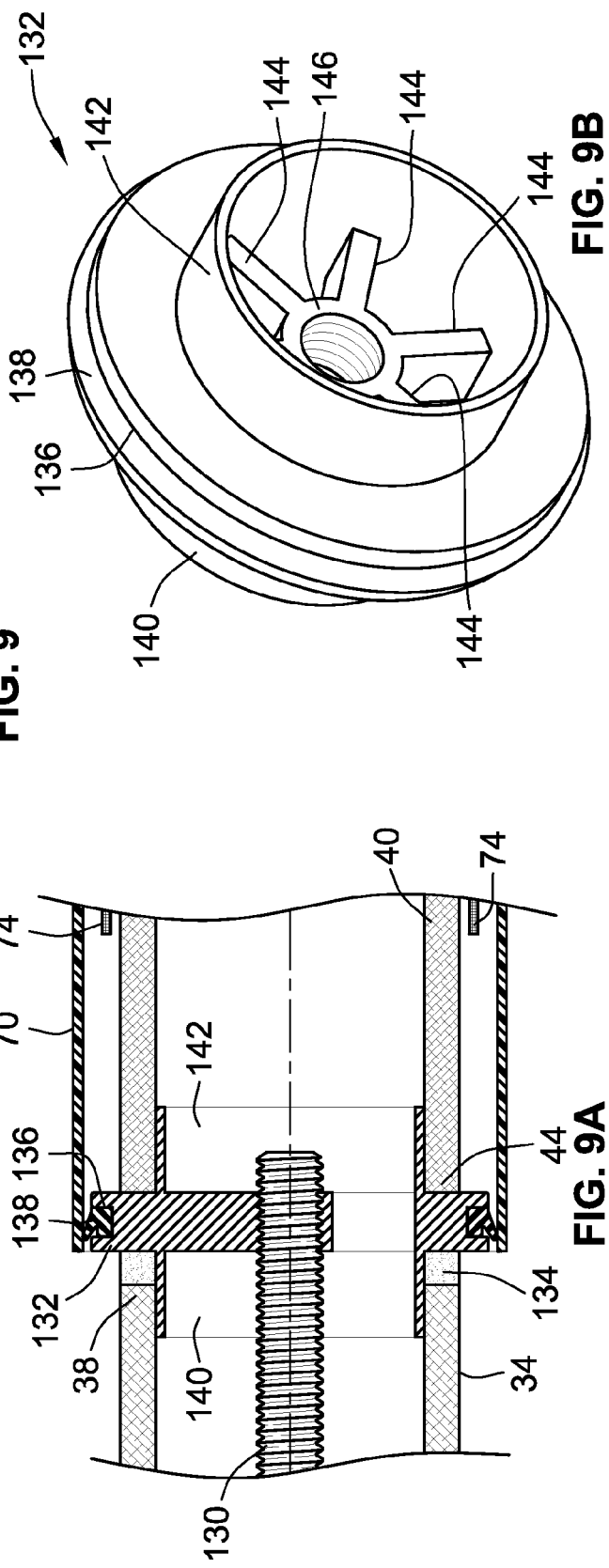

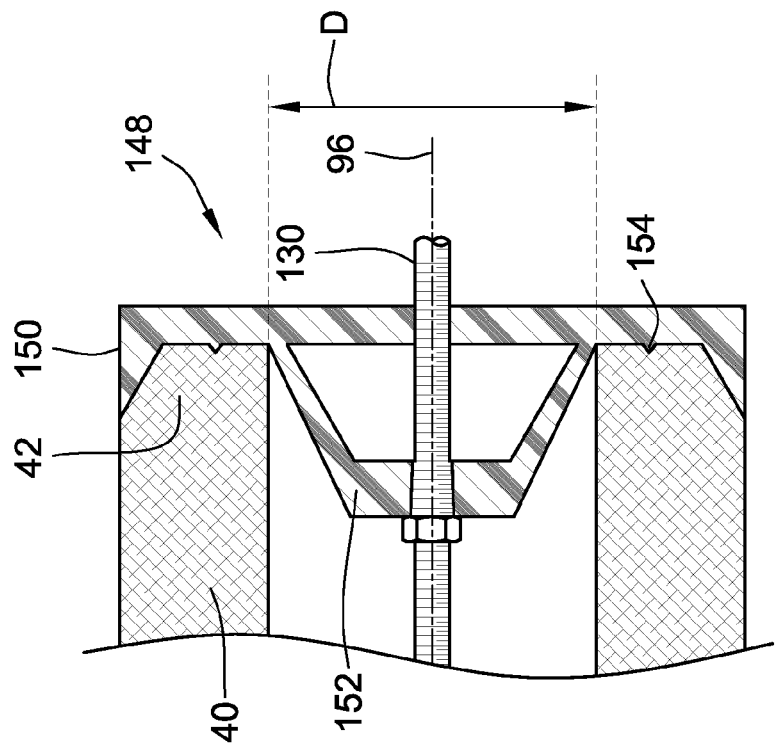
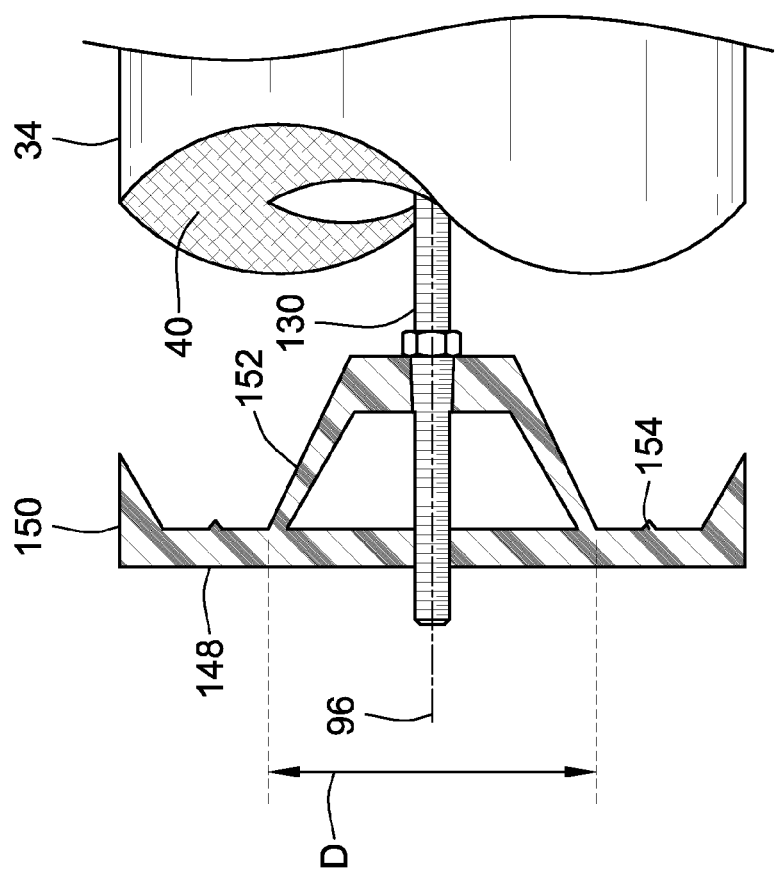

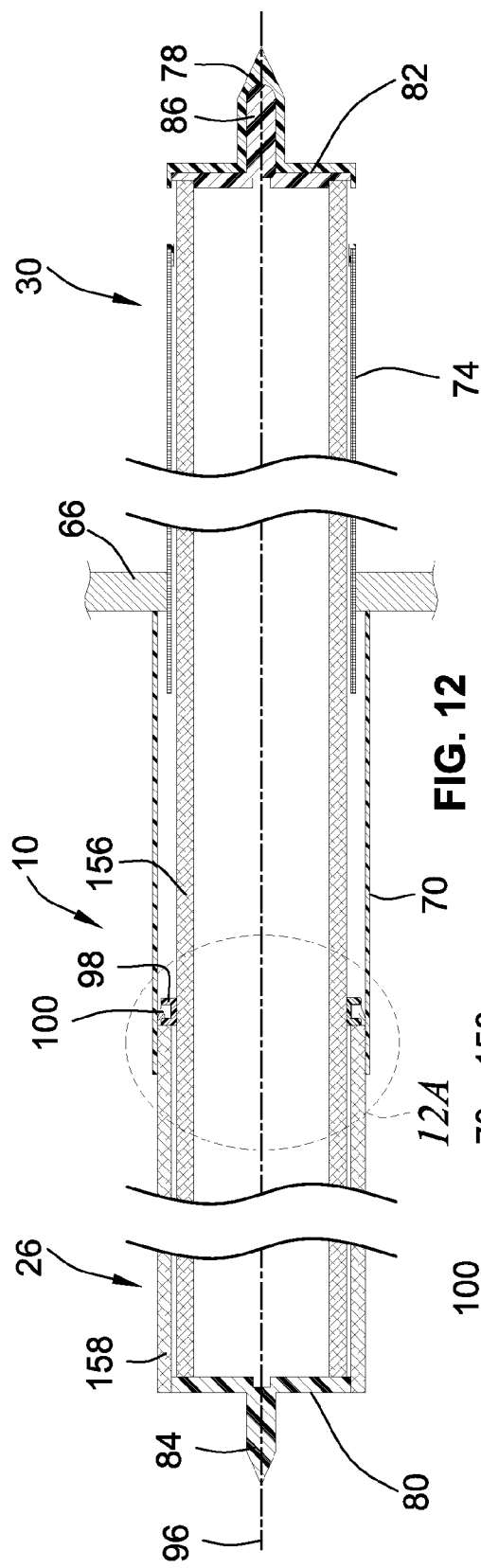
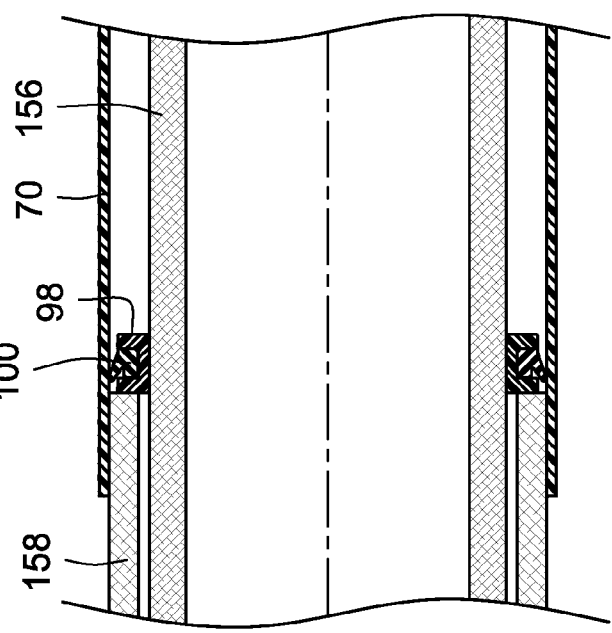
FIG. 12
FIG. 12A

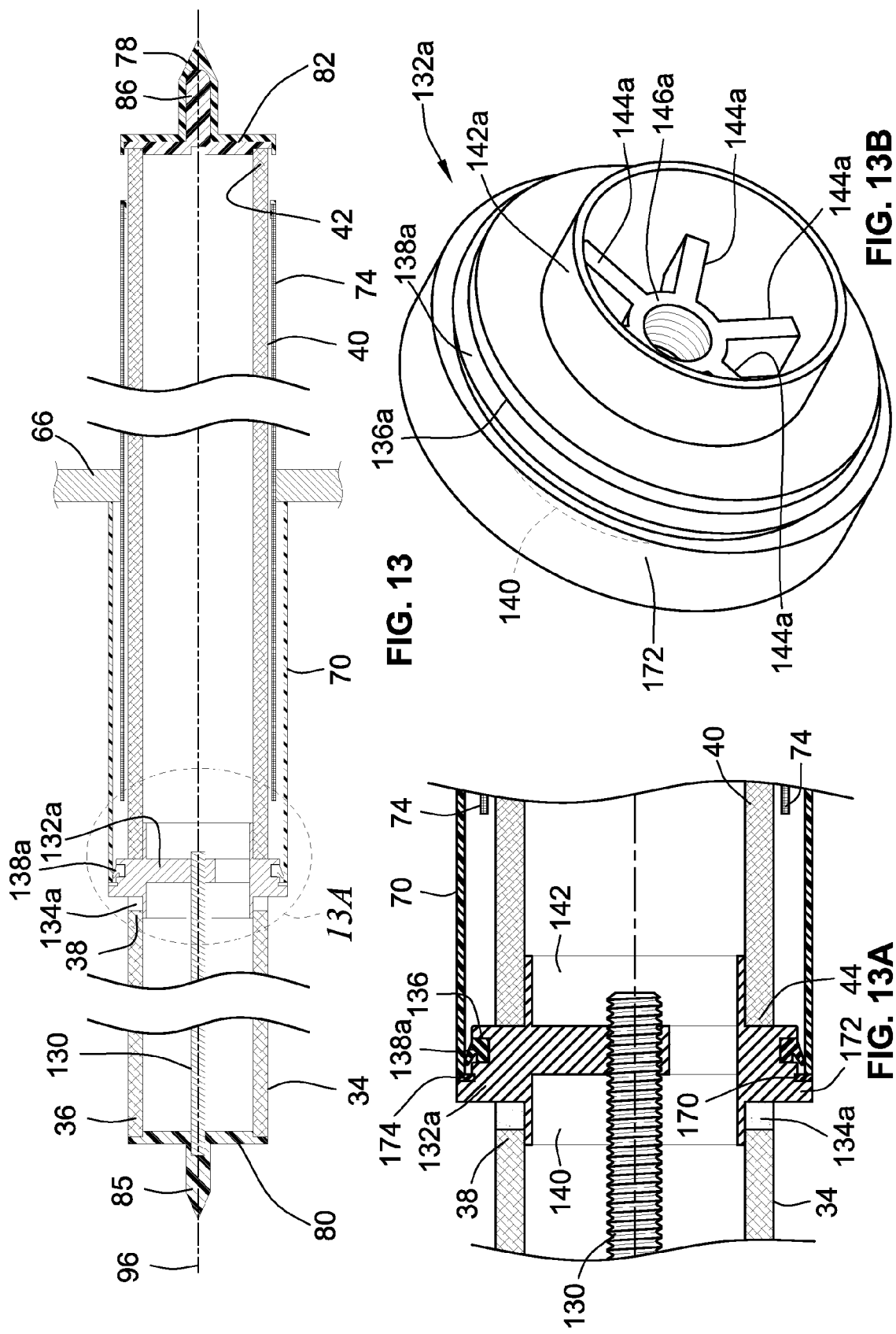

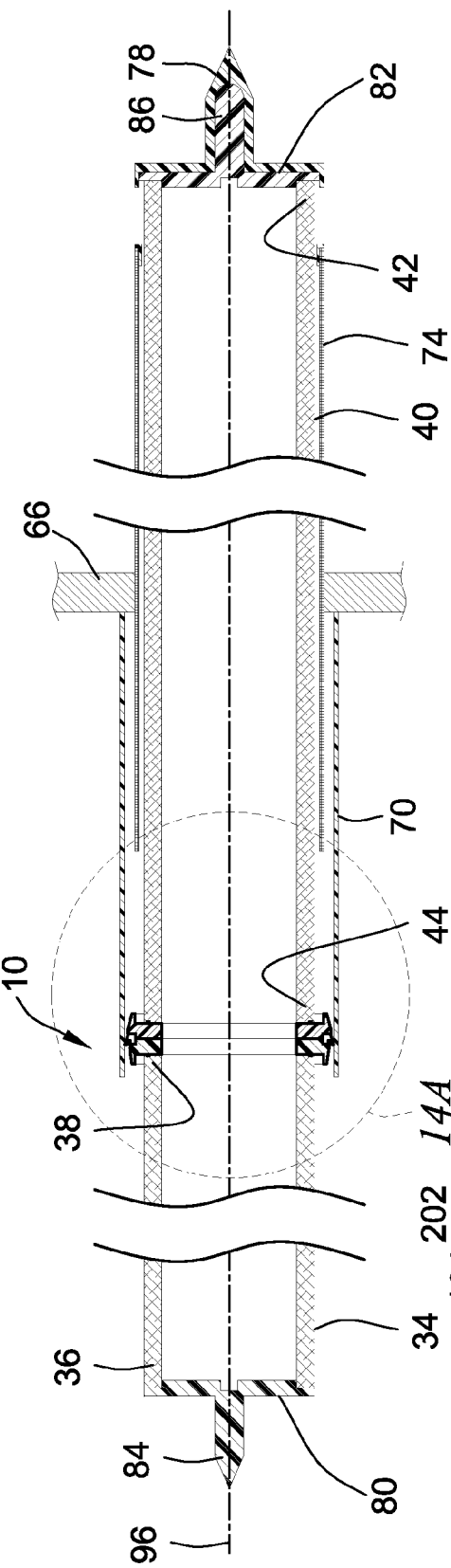
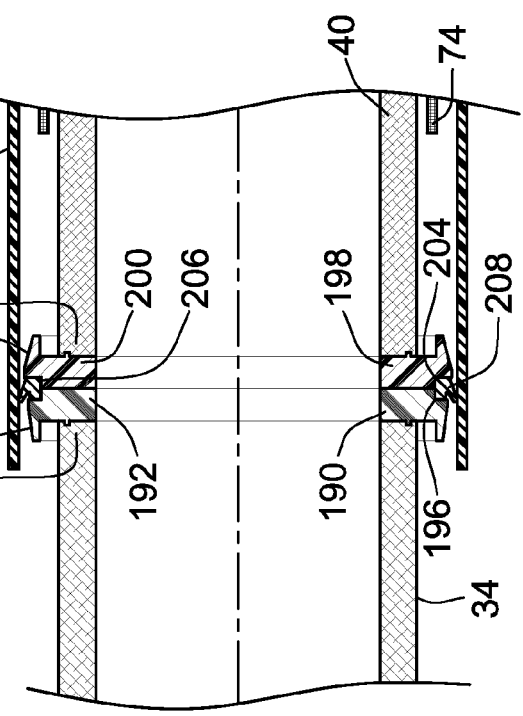
FIG. 14
FIG. 14A

MULTI-STAGE FILTER ELEMENT

FIELD OF THE INVENTION

This invention generally relates to filters, and more specifically to filters in multi-stage vessels.

BACKGROUND OF THE INVENTION

Multi-stage vessels for filtration of various fluids are known. Filter elements may be mounted into an apparatus having multiple compartments, as shown, for example in U.S. Pat. Nos. 5,919,284 and 6,168,647, both assigned to Perry Equipment Corporation, the disclosures of which are incorporated by reference herein in their entirety.

BRIEF SUMMARY OF THE INVENTION

In one aspect, a multiple stage filter element assembly is provided. The multiple stage filter element assembly includes a first filter element. The first filter element comprises a first tube of filter media surrounding a longitudinal axis. The multiple stage filter element assembly also includes a second filter element. The second filter element includes a second tube filter media surrounding a longitudinal axis when assembled with the first filter element. The first filter element may be adapted to axially abut the second filter element with an internal flow passage therebetween. The multiple stage filter element assembly includes a first seal for the first filter element. The multiple stage filter element assembly also includes a second seal for the second filter element. The first and second seal elements may be adjacent each other proximate an interface between the first and second filter elements when in abutting relation.

According to the above aspect, each filter element may include its own seal to seal against the guide tube in the housing. According to an embodiment, no physical connection may be needed between two elements, but rather they may be placed proximate and may further be in abutting and/or interfitting relation. The high pressure side of the vessel may be used to keep the abutting relation. Further, an intermediate pressure chamber may be formed between seals that is generally static during operation.

Alternatively, one of the filter elements may employ two seals with the second seal sealing between the filter elements. The second seal may also be pressure actuated such as an axial seal between filter element.

In one embodiment, the multiple stage filter element assembly may also include a first end cap. The first end cap encloses one end of the first filter assembly. The first end cap may have a first locating post. The multiple stage filter element assembly may also include a second end cap. The second end cap encloses one end of the second filter element. The second end cap may have a second locating post on an opposite side of the assembly as compared with the first locating post.

The first and second seal elements may be in surrounding relation of the first and second filter elements respectively. The first and second seals may each be radial seals adapted for sealing against a common internal surface of a cylindrical guide of a tube sheet.

At least one of the first and second tubes of filter media may have an uncapped end surface at the interface. In one embodiment each of the tubes of filter media has an uncapped end surface at the interface.

The multiple stage filter element assembly may also include a first end cap sealing the end surface of one of the first and second tubes of filter media at the interface. The first end cap may include a first annular guide portion extending transversely from the first end cap along a portion of the interior surface of the other of the first and second tubes of filter media. The multiple stage filter element assembly may also include an second end cap sealing the end surface of the other of the first and second tubes of filter media at the interface. The second end cap may include a second annular guide portion configured to cooperatively threadably engage the first annular guide portion.

In one embodiment, the first and second filter elements may be arranged in axially abutting end to end relation and may be mounted to each other. In one embodiment, the first and second filter elements are not permanently attached but readily removable from each other.

In one embodiment, the first and second tubes of the multiple stage filter element assembly each have a length of between 1 and 4 feet. The first and second tubes may be generally cylindrical with an outer diameter of between 2 and 6 inches. The first and second tubes may also have an inner diameter of between 1 and 5 inches.

In one embodiment, the multiple stage filter element assembly also includes a third filter element comprising a third tube of filter media coaxial with and enclosing at least a portion of the first tube of filter media. The third tube of filter media may be a type of filter media different than at least one of the first tube of filter media and second tube of filter media.

In another aspect of the present invention, a multiple stage filtration vessel is provided. The multiple stage filtration vessel includes a closed vessel having a longitudinally extending length and having an initially open interior. The closed vessel also includes an inlet at an extent and an outlet at an opposite extent thereof. The multiple stage filtration vessel also includes a partition located within the vessel interior. The partition divides the vessel interior into a first stage and a second stage. The multiple stage filtration vessel also includes a generally cylindrical guide. The generally cylindrical guide defines an opening in the partition. The multiple stage filtration vessel also includes a filter element assembly. The filter element assembly extends through the opening. The filter element assembly has a hollow core wherein flow passage through the multiple stage filtration vessel is provided. A gas stream flows into the first stage through the inlet, into and through the hollow core of the filter element assembly, back out through the filter element assembly into the second stage to the outlet. The filter element assembly includes an inner filter media tube and an outer filter media sleeve at the first stage. The outer filter media sleeve surrounds the inner filter media tube. The outer filter media sleeve may be more open and porous than the inner filter media tube.

In one embodiment, at least one of the outer filter media sleeve and the inner filter media tube may be a pleated filter member. In another embodiment, the inner filter media tube and the outer filter media sleeve may each be formed from non-pleated depth filtration medias having a radial thickness of at least 0.20 inches.

In one embodiment, the inner filter media tube may extend a full length of a filtration chamber within the open interior between the extents. The outer filter media sleeve makes then a partial length only to the partition. A seal sealing the filter element assembly to the generally cylindrical guide may also be included.

In another embodiment, the multiple stage filtration vessel also includes a third filter media sleeve. When assembled with the inner filter media tube, the third filter media sleeve may be adapted to axially abut the inner filter media tube with an internal flow passage therebetween.

In another embodiment, a multiple stage filtration vessel is provided. The multiple stage filtration vessel includes a closed vessel having a longitudinally extending length. The closed vessel includes an initially open interior. The closed vessel also includes an inlet at an extent and an outlet at an opposite extent thereof. The multiple stage filtration vessel also includes a partition located within the vessel interior. The partition divides the vessel interior into a first stage and a second stage. The multiple stage filtration vessel also includes a generally cylindrical guide to finding an opening in the partition. The multiple stage filtration vessel also includes a filter element assembly. The filter element assembly extends through the opening. The filter element assembly has a hollow core wherein flow passage through the multiple stage filtration vessel is provided. A gas stream flows into the first stage through the inlet, into and through the hollow core of the filter element assembly, and back out through the filter element assembly into a second stage to the outlet. The filter element assembly includes a first filter element. The first filter element includes a first tube of filter media surrounding a longitudinal axis. The filter element assembly also includes a second filter. The second filter element includes a second tube of filter media surrounding a longitudinal axis. When the first filter element and second filter element are assembled, the first filter element and the second filter element form an internal flow passage therebetween through the hollow core. The first and second filter elements are independent and readily attachable and detachable from each other. Each of the filter elements is directly or indirectly supported by the generally cylindrical guide.

Yet another aspect is directed toward a three stage filter element. The filter element includes a first stage including a prefilter. The first stage also includes a portions of a continuous tubular filter element arranged inside of the prefilter. An annular seal may be disposed about the continuous tubular filter element to establish a second stage. The prefilter may extend only a portion of the length of the continuous filter element. This can provide a greater holding capacity at the upstream side of the filter element. The prefilter can be more open and of a lower efficiency than the continuous tubular element.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a condensed view illustrating embodiments of filter end caps;

FIG. 4 is an isometric view of an embodiment of a cap portion;

FIG. 5 is a cross-sectional view of the cap portion taken along line 5-5 in FIG. 4;

FIG. 6 is a cross-sectional view of an embodiment of a multiple stage filter element assembly mounted in an exemplary vessel;

FIG. 6A is an enlarged detail view of FIG. 6;

FIG. 6B is an enlarged detailed cross-sectional view of the ring seal holder and ring seal of FIG. 6A, which ring seal and seal holder may also be used in other embodiments;

FIG. 6C is a cross-sectional view of an embodiment of a multiple stage filter element assembly mounted in an exemplary vessel illustrating an internal element support core;

FIG. 6D is an enlarged detail view of FIG. 6;

FIG. 7 is a cross-sectional view of a second embodiment of a multiple stage filter element assembly mounted in an exemplary vessel;

FIG. 7A is an enlarged detail view of FIG. 7;

FIG. 7B is an isometric view of an embodiment of the ring divider seal end cap of FIGS. 7 and 7A;

FIG. 7C is a cross-sectional view of an alternate embodiment of a multiple stage filter element assembly mounted in an exemplary vessel;

FIG. 7D is an enlarged detail view of FIG. 7;

FIG. 8 is a cross-sectional view of a third embodiment of a multiple stage filter element assembly mounted in an exemplary vessel;

FIG. 8A is an enlarged detail view of FIG. 8;

FIG. 8B is an isometric disassembled view of an embodiment of the ring divider seal end cap and the second filter element end cap of FIGS. 8 and 8A cooperatively engageable therewith shown in semi-cross-section to illustrate the threading;

FIG. 9 is a cross-sectional view of a fourth embodiment of a multiple stage filter element assembly mounted in an exemplary vessel;

FIG. 9A is an enlarged detail view of FIG. 9;

FIG. 9B is an isometric view of an embodiment of the ring divider seal end cap of FIGS. 9 and 9A;

FIG. 10 is a partial cross-sectional view of the filter element of FIGS. 9A and 9B mounted on an alternate end cap with a portion of the filter element removed;

FIG. 11 is an enlarged detail view of FIG. 10;

FIG. 12 is a cross-sectional view of a fifth embodiment of a multiple stage filter element assembly mounted in an exemplary vessel;

FIG. 12A is an enlarged detail view of FIG. 12;

FIG. 13 is a cross-sectional view of a sixth embodiment of a multiple stage filter element assembly mounted in an exemplary vessel;

FIG. 13A is an enlarged detail view of FIG. 13;

FIG. 13B is an isometric view of an embodiment of a ring divider seal end cap of FIGS. 13 and 13A;

FIG. 14 is a cross-sectional view of a seventh embodiment of a multiple stage filter element assembly mounted in an exemplary vessel; and FIG. 14A is an enlarged detail view of FIG. 14.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As will be appreciated, multi-stage filtration may be used in various suitable applications. Exemplary filtration applications using various embodiments of a multi-stage filter assembly 10 are described below with reference to the drawings.

Embodiments of multi-staged filter elements of the present invention may be used to improve the apparatuses described in U.S. Pat. Nos. 5,919,284 and 6,168,647 or may be used with various other suitable apparatuses to provide improved multi-stage filtration.

Figure 1:
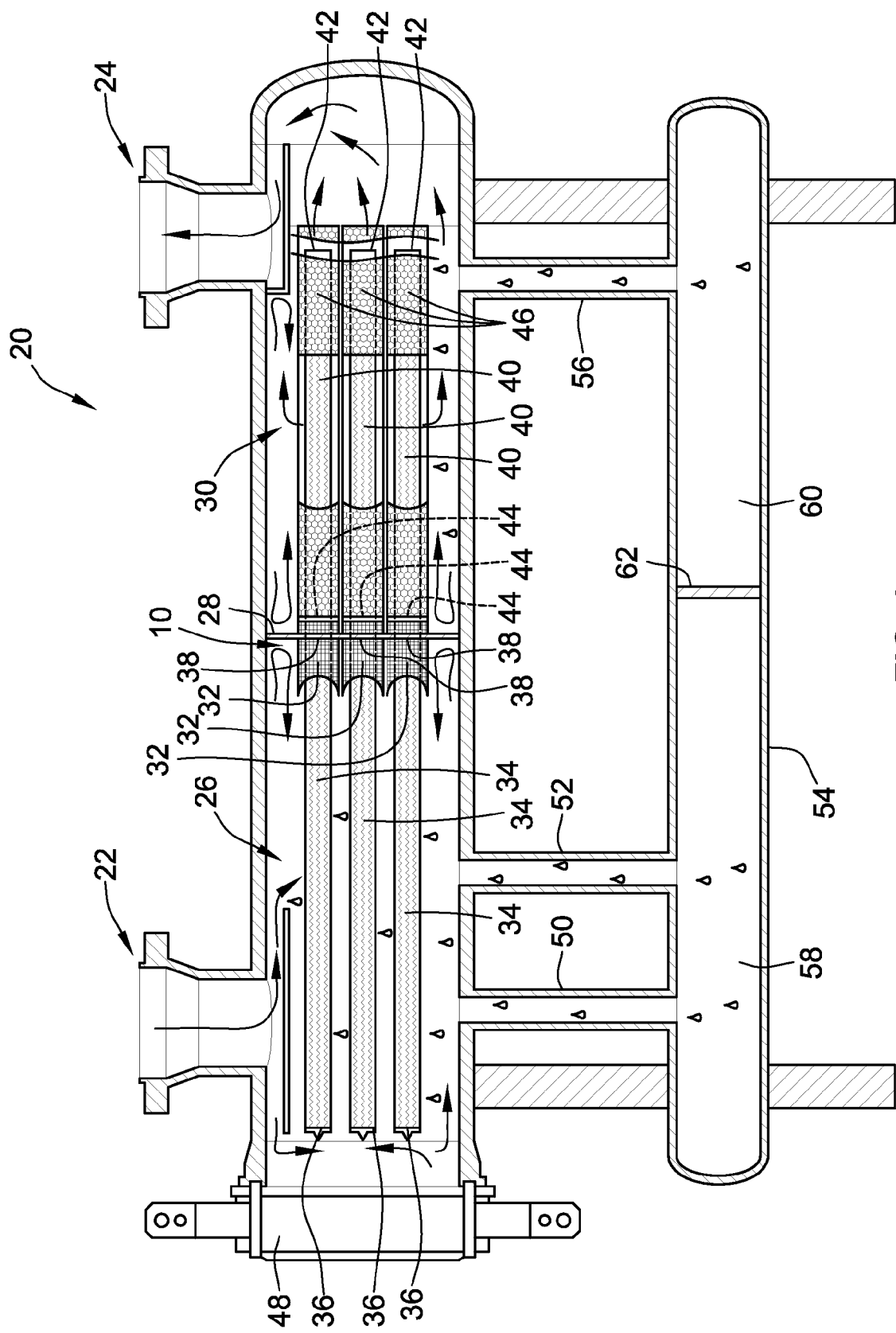
FIG. 1 is a partial cross-sectional view of an embodiment of a multi-stage vessel.

With reference to FIG. 1, an exemplary multi-stage vessel 20 with which an embodiment of a multi-stage filter assembly 10 may be used is illustrated. In such a multi-stage vessel 20, a fluid containing various contaminants may be filtered in various stages, as will be further described below.

In one embodiment, the vessel 20 includes an inlet 22 and an outlet 24. The relationship of various elements in this disclosure will be described in terms of "upstream" and "downstream." For purposes of this disclosure, "upstream" will mean more proximate the inlet 22 in the fluid flow path (as will be further described below) and "downstream" will mean more proximate the outlet 24 in the fluid flow path.

With further reference to FIG. 1, the inlet 22 is in fluid communication with a first stage 26 defined within the vessel 20. A tubesheet 28 generally divides the first stage 26 from a second stage 30, defined within the vessel 20, and is provided with a plurality of annular guides 32 providing passage from the first stage 26 to the second stage 30. The annular guides 32 are each configured to receive an embodiment of a multi-stage filter assembly 10, as will be further described below. Additionally, the annular guides 32 may be integrally formed as a single piece with the remainder of the tubesheet 28 or may be formed separately and attached to the dividing wall and partition 66 of the tubesheet 28 by any suitable means such as metal welds.

The tubesheet 28 provides a generally fluid-tight seal around the interior of the vessel 20 between the first stage 26 and the second stage 30. The second stage 30 is in fluid communication with the outlet 24. The partition and tubesheet 22 thereby divide the vessel into a high pressure side at the inlet and a low pressure side at the outlet, with a pressure differential between sides typically between 0.1 and 20.0 PSI in most applications; and with a total pressure (on the inlet side) experienced in the vessel 20 during operation ranging from a vacuum to about 10,000 PSI. The pressure vessel 20 and components thereof will typically be rated to at least handle 2,000 PSI for many applications, and certainly rated higher (e.g. up to 10,000 PSI to 20,000 PSI or higher for more intense applications).

As will be more fully explained below, a plurality of cylindrical first stage filter elements 34 each having a hollow core, a first end 36, and a second end 38 extend through the first stage 26 of the vessel 20. The first ends 36 of the first stage filter elements 34 are located in the upstream portion of the first stage 26. The first stage filter elements 34 extend downstream through the first stage 26 into the tubesheet 28 where the second ends 38 of the first stage filter elements 34 are each received into and supported by the upstream portion of one of the annular guides 32.

A corresponding plurality of cylindrical second stage filter elements 40 each having a hollow core, a first end 42, and a second end 44 are provided within the second stage 30. The second ends 44 of the second stage filter elements 40 are each received the downstream portion of one of the annular guides 32. The second stage filter elements 40 extend coaxially with respect to first stage filter elements 32 from the tubesheet 28 through the second stage 30, and are each mounted proximate their first end 42 proximate the downstream portion of the second stage 30. The first and second stage filter elements 34, 40 may be of the same or different lengths. In certain embodiments, typically the first and second stage filter elements are about the same axial length (e.g. identical length or plus/minus about 10% difference in length).

With further reference to FIG. 1, extending concentrically from the annular guides 32 through the second stage 30 are a plurality of tubular flow diffusers 46. The second stage filter elements 40 each extend concentrically with one of the flow diffusers 46 therethrough through the second stage 30. The flow diffusers 46 may be sized such that a selected clearance distance exists between the second stage filter elements 34 and the flow diffusers 46 when the second stage filter elements 34 are received therein. In one embodiment, and as will be more fully explained below, the flow diffusers 46 may act as coalescers to further coalesce contaminants from the fluid being filtered, and may help to prevent the filtered fluid from being recontaminated upon exiting the second stage filter 40 into the second stage 30.

As illustrated in FIG. 1, the vessel 20 includes a head 48 selectively providing access to the interior of the vessel 20 for changing the filter elements 34, 40. To change the filter elements 34, 40, the head 48 may be opened and either one or both of the filter elements 34, 40 may be slidably removed and/or replaced.

In one embodiment, the vessel 20 also includes a pair of drain passages in downcomers 50, 52 in fluid communication with the first stage 26 and connected to a sump 54 for drainage and collection of solids and pre-coalesced liquids filtered from the fluid in the first stage 26. The vessel 20 also defines a second drain passage via stage downcomer 56 in fluid communication with the second stage 30 and connected to the sump 54. The sump 54 is divided into a first-stage compartment 58 and a second-stage compartment 60 by an impermeable baffle 62 which isolates the first-stage compartment 58 from the second stage compartment 60. Also, various drains for selectively removing separated and coalesced fluids may be included.

Figure 2:
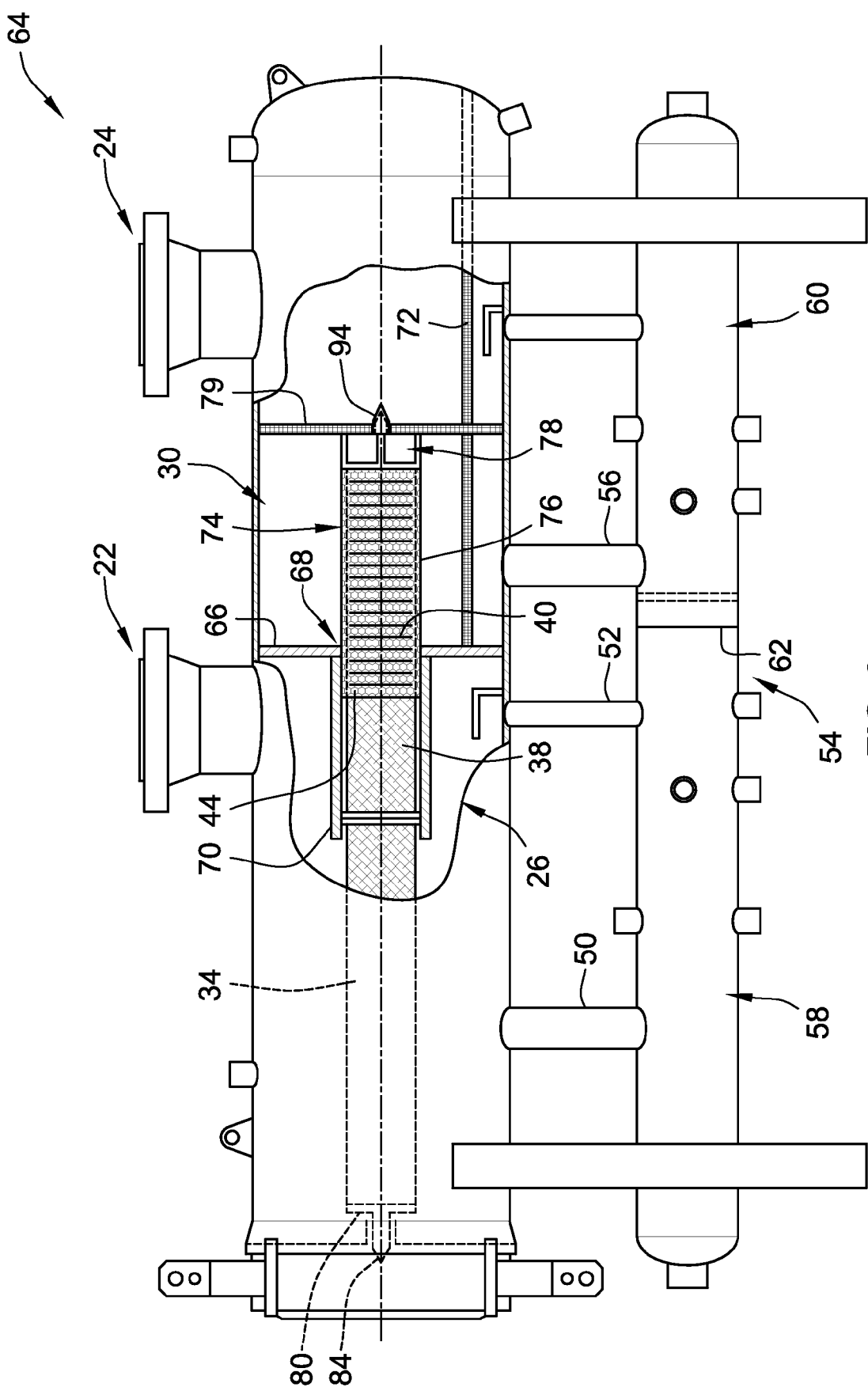
FIG. 2 is a partial cross-sectional view of another embodiment of a multi-stage vessel.

With reference to FIG. 2, a second embodiment of a vessel 64 is illustrated. The vessel 64 is similarly divided into a first stage 26 and a second stage 30 by the transverse partition 66. The transverse partition 66 defines a plurality of openings 68. A tubular filter guide 70 is aligned with each opening 68 and extends longitudinally a selected distance from the partition 66 into the first stage 26.

The transverse partition 66 and the tubular filter guides 70 may be formed from plastic, metal, or any other suitable material known in the art, but are typically metal plate material. The tubular filter guides 70 may be unitarily formed with the transverse partition 66 as a single piece or may be formed separately and attached to the transverse partition 66 by any suitable means, typically annular welds. Though only a single opening 68 and tubular filter guide 70 is illustrated in FIG. 2, it will be understood that any suitable number of tubular filter guides 70 and openings 68 in the transverse partition 66 may be provided.

As in the previous embodiment, first stage filter elements 34 extend through the first stage 26 with their second ends 38 each disposed within a tubular filter guide 70.

As in the previous embodiment, the vessel 64 includes an inlet 22 in fluid communication with the first stage 26. The inlet 22 is located near the partition 66 such that as a fluid flows through the inlet 22 into the first stage 26, the fluid impinges upon the filter guides 70. As such, the filter guides 70 aid in the removal of contaminants from the fluid while protecting the first stage filter element 34 disposed therein.

With regard to the second stage 30, a screen member 72 is disposed in a lower portion of the second stage 30. The screen member 72 extends substantially the length of the second stage 30 and acts as a barrier to prevent coalesced contaminants that have collected in the bottom of the vessel from becoming re-entrained in the fluid. The screen member 72 may be formed from woven steel material or any other suitable material.

A plurality of basket shaped impingement baffles 74 are inserted through the tubular filter guides 70 and extend through the second stage 30. The baffles 74 may prevent liquids coalesced from the fluid from being re-entrained in the fluid as the fluid flows through the second stage 30. The baffles 74 include a basket portion 76 and a cap portion 78, as will be more fully explained below. Second stage support screen 79 is disposed in the second stage 30 and extends generally transversely thereacross. The screen 79 may be integrally connected to form a single webbed network. The screen 79 is spatially disposed within the second stage 30 such that the fluid may flow unabated therethrough towards the outlet 24. The screen 79 is configured to support the baffles 74 and the second stage filter elements 40. The screen 79 may be formed from plastic, metal, or any other suitable material, but typically metal mesh or perforated metal material.

The first ends 36, 42 of the filter elements 34, 40 and their support within the vessel 64 are now further described.

As is illustrated in FIG. 3, the first ends 36, 42 of each of the first and second stage filter elements 34, 40 each include end caps 80, 82. The end caps 80, 82 may be permanently connected to and each form a fluid-tight seal with their respective filter elements 34, 40, such that fluid must pass through the wall of each filter 34, 40 to reach the hollow core of each filter 34, 40. Each of the filter end caps 80, 82 includes a post 84, 86 which tapers inwardly. In one embodiment, the post 86 is of a different size than the post 84. As will be further explained below, this differential sizing will easily allow a user to distinguish between the first stage filter element 34 and the second stage filter element 40, as well as prevent accidental insertion of the first stage filter element 34 into the second stage 30.

The end caps 80, 82 may be formed from plastic, metal, a combination thereof, or any other suitable material.

With reference to FIGS. 4 and 5, the cap portion 78 of a baffle 74 is illustrated. The cap portion 78 is generally cup-shaped with a plurality of longitudinal slots 88 arranged around a cylindrical cup wall 90 and which terminate at a flat cup lid 92. A hollow basket cap portion post 94, concentric with the cup wall 90 protrudes axially away from the cup lid 92. The basket cap portion post 94 defines a receiving space 95, configured to matingly receive the post 86 of the second stage filter end cap 82 when the second stage filter element 40 is inserted into the impingement baffle 74. In one embodiment, due to the differential sizing of post 84 and post 86, the receiving space 95 will not receive post 84, as post 84 is too large to fit into the receiving space 95 and is larger than post 86. Thus, a user would be prevented from accidentally inserting the first stage filter element 34 into the second stage 30.

Returning to FIG. 2, when the second stage filter element 40 is received into the impingement baffle 74, as in the previous embodiment, a clearance preferably exists between the impingement baffle 74 and the second stage filter element 40, typically between 0.10 and 0.40 inches. As will be explained further below, the impingement baffle 74 prevents contaminants coalesced or filtered from the fluid passing through the second stage filter element 40 from being re-entrained into the fluid. The impingement baffle 74 provides a mechanism for such contaminants to collect and ultimately drain off into the second stage sump 60.

In one embodiment, the impingement baffle 74 may be integrally formed with the second stage filter element 40 and inserted into or removed from the second stage 30 with the second stage filter element 40 as a single piece. In another embodiment, the impingement baffle 74 and the second stage filter element 40 may be separately formed. As illustrated, the impingement baffle 78 and cap portion 74 are a separate component apart from the second stage filter element 40. The end cap 82 of the second stage filter element 40 is slidably and removably received within the cap portion 74, with post and receptacle structures providing generally concentric location such that an annular space and gap is provided between the outer periphery of the second stage filter element 74 and the inner peripheral surface of the impingement baffle 78.

With further reference to FIG. 2, the second stage filter element 40 in an operative configuration extends from its first end 42 and cap 82 (see FIG. 6) that is received within the cap portion 78 of the baffle 74. From there, the second stage filter element extends back toward the first stage through the second stage 30 within the baffle 74 and into the tubular filter guide 70 into which it is received. The other end 44 of the second stage filter element 40 is arranged proximate the second end 38 of the first stage filter element 34, as will be more fully described below.

Having described the basic structure of a pair of exemplary vessels 20, 64 with which an embodiment of a multi-stage filter assembly 10 may be used, the general flow path of the fluid to be filtered will be described.

With reference to FIG. 1, in the first embodiment, generally a fluid will pass into the vessel 20 through the inlet 22 and into the first stage 26. The fluid will then be forced radially through the element from the exterior to the interior hollow core of the cylindrical first stage filter elements 34. The fluid will then travel within the first stage filter elements 34 to the tubesheet 28. The fluid will then pass from the interior of each first stage filter element 34 to the interior of a respective cylindrical second stage filter element 40 and pass within the core of the second stage filter element 40 into the second stage 30. The fluid will then be forced radially outward from the interior of the cylindrical second stage filter elements 40 to the exterior of the second stage filter elements 40 within the second stage 30, and therefrom through the outlet 24 to exit the vessel 20. As will be immediately apparent, filtering of the fluid will take place each time the fluid passes through one of the filter elements. Thus, the fluid in the flow path described above will undergo two stages of filtering. As will be discussed below, based on the type of filter elements 34, 40 selected, various types, amounts, etc., of contaminants may be filtered at each pass through each filter element 34, 40.

With reference to FIG. 2, in the second embodiment, fluid will enter through the inlet 22 and encounter the tubular filter guides 70 which will turn the fluid in the first stage 26 helping with an initial filtering step. The fluid then will pass through the wall of the first stage filter elements 34 into the hollow core of these elements 34. The fluid will pass from the cores of the first filter elements 34 into the hollow cores of respective second stage filter elements 40 within the tubular filter guides 70. The fluid will progress within the core of the second stage filter element 40 and exit through the wall of the second stage filter element 40, pass through the impingement baffles 74, pass past the second stage support screen 79 and out through the outlet 24.

Such flow paths may be used for various suitable filtration, coalescing, and separation applications for various fluids. Other suitable flow paths are also envisioned.

Various embodiments of multi-stage filter element assemblies 10 are now further described below. The assemblies 10 are described as installed in the second embodiment vessel 64 described above, but could be installed in the first vessel 20 or various other filtering apparatuses, as will be recognized by one having ordinary skill in the art in light of the present disclosure.

As can be seen in FIGS. 6 and 6A, the first stage filter element 34 and the second stage filter element 40 are sized and configured such that their second ends 38, 44 substantially abut in an assembled configuration, placing the interiors of the filter elements 34, 40 in continuous fluid communication. The first stage filter element 34 and the second stage filter element 40 are configured to surround and extend along a longitudinal axis 96. The second ends 38, 44 of the filter elements 34, 40 may be laminated or otherwise secured together and not removable from each other. Additionally, the second ends 38, 44 of the filter elements 34, 40 may be configured such that the filter elements 34, 40 are not permanently attached and may be readily removable from one another. In other words, the filter elements 34, 40 may not be connected and as such each filter element can be removed free and clear of the other filter element without further manipulation. Further, the high pressure in the inlet side exerts axial pressure on the first filter element to urge it into abutting relation with the first element to maintain position without the need for connections therebetween.

Again with reference to FIG. 6A, a first ring seal holder 98 surrounds the first stage filter element 34 proximate its second end 38. The first ring seal holder 98 is located between the first stage filter element 34 and one of the tubular filter guides 70.

As may be seen in FIG. 6B, the first ring seal holder 98 carries an annular seal 100, in one embodiment a chevron-type seal. This is a type of pressure actuated seal and can be a radial seal, wherein pressure acting upon the wiper/sealing annular flange portion may press it in to greater sealing relationship. The first ring seal holder 98 is generally U-shaped, having a seal channel 102 and generally parallel legs 104, 106. The seal channel 102 is configured to receive and carry the annular seal 100.

The annular seal 100 may be a chevron-type seal made of an elastomeric material, or any other suitable type of seal, such as a conventional O-ring, and may be made of any suitable type of material. The annular seal 100 is releasably sealed and carried in the seal channel 102 by a tension fit, but may be bonded or otherwise adhered in the seal channel 102 or to the legs 104, 106 by any suitable means known in the art.

The chevron-type annular seal 100 includes a seal base portion 108, a seal vertex portion 110, and a seal cone portion 112. The seal base portion 108 and the seal cone portion 112 are integrally joined at the seal vertex portion 110. The seal cone portion 112 may be frustoconically shaped. In one embodiment the seal base portion 108 and the seal cone portion 112 form an angle α of about 60 degrees, though other angles are also envisioned, typically between 30 and 85 degrees.

As can be seen in FIG. 6A, the cone portion 112 extends in the upstream direction, with the chevron-type annular seal 100 and the first ring seal holder 98 forming a fluid-tight seal between the tubular filter guide 70 and the first stage filter element 34. The chevron-type annular seal 100 may be effective in high pressure applications due to its ability to maintain the fluid-tight seal under increased pressure due to its configuration.

The annular ring seal holder 98 may be formed from plastic such as polyester and sealed and permanently affixed to the filter 34 in surrounding relation and sealed relation. The ring seal holder 98 may be sealingly bonded to the filter 340 by a heat treatment, glue, adhesive, or any other suitable means. In one embodiment, the ring seal holder 98 does not unnecessarily compress the filter 34. In other embodiments, the ring seal holder 98 my be formed from any suitable material and may be removable from the filter 34.

With further reference to FIG. 6A, a second ring seal holder 114 surrounds the second stage filter element 40 proximate its second end 44 and receives a second annular seal 116. The second ring seal holder 114 and the second annular seal 116 are disposed between the second stage filter element 40 and the tubular filter guide 70, providing a fluid-tight seal between the second stage filter element 40 and the tubular filter guide 70. The second ring seal holder 114 and the second annular seal 116 may be of a type described above in regards to the first ring seal holder 98 and the first annular seal 100, or may be of any other suitable type.

Generally, the fluid pressure decreases downstream along the fluid path. The function of the pair of ring seal holders 98, 114 and annular seals 100, 116 is further described with reference to FIG. 6.

The fluid within the second stage 30, having exited the second stage filter element 40 may be at a lower pressure than the fluid entering the first stage 26. Therefore, by providing the first ring seal holder 98 and the first annular seal 100, the fluid entering the first stage 26 may be forced to pass through the first filter element 34 to the hollow core of the first stage filter element 34 and prevented from entering the second stage 30 without being filtered.

Additionally, fluid within the hollow core of the first stage filter element 34 and at the second end 44 of the second stage filter element 40 may be at an intermediate but lower pressure than the pressure outside of the first stage filter elements 34. As such, immediately downstream of the first ring seal holder 98 an annular chamber and space 118 is provided for such intermediate pressure between the first ring seal holder 98 and the second ring seal holder 114. The second ring seal holder 114 and the second annular seal 116 are provided to prevent fluid that has not passed through the walls of both the first and second stage filter elements 34, 40 from entering the second stage 30, such as at the abutment seam between the first and second stage. Any gap formed between the two elements 34, 40 at the abutment and proximity region is therefore not of consequence.

Thus, the second ring seal holder 114 and second annular seal 116 may provide a fluid-tight seal to prevent partially filtered fluid flow through only a portion and not the entire radial thickness of the second stage filter element 40. The pressure within the space 118 between the seal holders 98, 114 and the annular seals 100, 116 will about equalize with the pressure of the fluid within the hollow core and flow passage of the filters 34, 40—hence it is a generally static gas region in annular chamber and space 118. It is noted that the wiper flange of each radial seal is directed in the same direction for pressure actuation. Thus the second seal 116 may be actuated by the intermediate pressure region in space 118 to be pressed into greater radial seal relationship during operation.

The first and second ring seal holders 98, 114 and first and second annular seals 100, 116 thus provide fluid and pressure isolation between the first stage 26 and the second stage 30 of the vessel 64, preventing fluid from entering the second stage 30 without passing from the interior to the exterior of one of the second stage filter elements 40, as well as preventing fluid from entering the interior of the second stage filter element 40 or the second stage 30 without passing through the first stage filter element 34. Thus contamination of filtered fluid with unfiltered or partially filtered fluid is avoided. The first and second ring seal holders 98, 114 may be configured any suitable axial distance from one another. Further, to the extent the first stage filter elements 34 become spent prematurely and remaining capacity is left on the second stage elements 40, the first stage elements 34 may be removed allowing for one stage operation, temporarily until the second stage elements 40 become spent. Additionally, in one embodiment, the spent first stage element 34 may be replaced leaving the second stage element 40 in place for another cycle.

The materials of the first stage filter element 34 and the second stage filter element 40 as described in relation to the first embodiment, and also as may be used in other embodiments, are further described below.

Each of the first stage filter element 34 and the second stage filter element 40 may be formed from the same or different types of filter material or media, and may be the same or different types of filter elements. For example, both may include one or more layers of a surface-loading type media. More preferably, each is a depth-loading type of filter media having several layers of depth loading media. Alternatively, one may include a surface-loading type while the other may include a depth-loading type of filter element. Each of the filter elements 34, 40 may be configured for coalescing and particulate filtration, or each may include membrane-type filter media (e.g., polymer films with specific pore ratings), nano-type filter media, or other filter media type known in the art. Thus, the first stage filter element 34 may include any one of these or any other suitable type of filter media, while the second stage filter element 40 may also include any one of these or any other suitable type of filter media. The filter media of the first and second stage filters 34, 40 may include the same types of filter media or may each include a different type of filter media. Thus, various different combinations of first stage and second stage filter elements 34, 40 including various different combinations of filter media included in each may be used, providing for flexibility in filtering.

First and second stage filter elements 34, 40 work in conjunction to perform various filtration and separation operations. For example, in one embodiment, the first stage filter element 34 includes a depth technology media with a thickness ranging from 0.3 to 1.0 inches at a removal level of 20 microns and larger designed to remove semi-solid type contaminants, while second stage filter element 40 is a pleated barrier type media with a thickness range of 0.05 to 0.2 inches, designed to have a solids removal rating of from 1.0 to 10.0 microns. The combination of handling the semi-solid larger contaminants with a depth media followed by handling smaller contaminants with an absolute rated barrier filter media provides a two stage system in one housing that may provide benefits over a single stage filter media, including longer life, while allowing for an absolute removal level down to from 10.0 to 1.0 microns.

In one embodiment, a multi-stage vessel 20 may be configured to filter a gaseous fluid. In another embodiment, a multi-stage vessel 20 may be configured to filter a liquid fluid. In one embodiment, second stage filter element 40 is a membrane barrier. In another embodiment, second stage filter element is a nano filter barrier configured to drop system removal levels down below 0.1 microns, thereby facilitating bacteria removal from various systems, e.g. water systems.

In one embodiment, a multi-stage vessel is configured for liquid separation. The first stage filter element 34 includes a depth fiberglass media configured to facilitate moisture removal from a hydrocarbon fluid. The element 34 utilizes relatively high intermolecular polar attraction forces of fiberglass to trap and pre-coalesce water droplets under 1.0 microns in diameter. The second stage filter element 40 includes a polymeric gradient depth media, for example, the type of filter media marketed by the Perry Equipment Corporation of Mineral Wells, Tex., under the PEACH mark. The second stage filter element 40 serves as a water droplet growth media, thereby producing droplets of a size that may eliminate the need for a secondary separator element.

In another embodiment, a multi-stage vessel is configured for liquid removal from a natural gas fluid. The first stage filter element 34 includes a hydrophobic fluorocarbon coated barrier configured to remove and collect water in the first stage sump 58 (illustrated in FIG. 2). The hydrophobic fluorocarbon coated barrier allows hydrocarbon liquids to penetrate through the first stage filter element 34 and to travel through the interior of the first stage filter element 34 to the interior of the second stage filter element 40. In this embodiment, the second stage filter element 40 includes a polymeric depth media, such as, for example, the type of filter media marketed by the Perry Equipment Corporation of Mineral Wells, Tex., under the PEACH mark, which is configured to perform a hydrocarbon droplet coalescing operation. Thus, upon the fluid passing through the second stage filter element 40, pure, water free hydrocarbons are collected in the second stage sump 60, while purified gas exits the outlet 24.

Herein liquid and gas applications are thus contemplated, and the word "fluid" is used to encompass both or other appropriate fluid possibilities.

The filter elements 34, 40 may be of similar or dissimilar construction, with similar or dissimilar density, porosity, and other qualities. The filter elements 34, 40 may be configured for separation, coalescence, filtering, a combination of these, or any other suitable purpose.

As one example, the first stage filter element 34 may be configured to filter solid particulates from the fluid being filtered, while the second stage filter element 40 may be configured to coalesce specific fluids from the fluid being filtered. Thus, many different pairs of filter elements 34, 40 suitable for various different applications are envisioned.

As stated above, one envisioned type of filter element for use in the present invention may include the type of filter media marketed by the Perry Equipment Corporation of Mineral Wells, Tex., under the PEACH mark.

Additionally, in one embodiment, it is envisioned that filter media such as that disclosed in U.S. Pat. No. 5,827,430, assigned to Perry Equipment Corporation of Mineral Wells, Tex., may be included in the first stage filter element 34 or the second stage filter element 40, or in both. One of the first or second stage filter element 34, 40 may include such filter media while the other may include any other suitable type of filter media. Additionally, it is envisioned that the first stage filter element 34 and/or the second stage filter element 40 may include filter media formed by the methods disclosed in U.S. Pat. No. 5,893,956, assigned to Perry Equipment Corporation of Mineral Wells, Tex.

Many different fluid types may be filtered, coalesced, separated, etc., including liquids, gases, mixtures, suspensions, solutions, etc., using many different combinations of first stage and second stage filter elements 34, 40 and filter media.

As the first filter element 34 or the second filter element 40 may, in one embodiment, not be permanently attached, each may be changed out and/or replaced individually, without changing both filter elements 34, 40, thus allowing for switching between various filtering applications and various pairings of filter element and filter media types.

Additionally, for example, should one of the filter elements 34, 40 wear more quickly, this element 34, 40 may be replaced without replacing the remaining element 34, 40 that may have worn less quickly. Thus, various types of fluids containing various types of contaminants may be filtered using an embodiment of a multi-stage filter element assembly 10 in an exemplary multi-stage vessel 20.

With reference to FIGS. 6C and 6D, another embodiment is provided. In this embodiment, an annular internal element support core 85 extends from the second end cap 82 through the interior of the second stage filter element 40 and into the interior of the first stage filter element 34. The annular internal element support core 85 generally lines the interior of the second stage filter element 40 and a portion of the first stage filter element 34 proximate its second end 38. The annular internal element support core 85 is perforated with holes to allow fluid flow therethrough, while providing support for the filter elements 34, 40. Additionally, when the first stage filter element 34 is replaced, it may be easily slid off of the annular internal element support core 85 and the core 85 may serve as a guide for sliding the new first stage filter element 34 in place.

The annular internal element support core 85 may be formed as a metal mesh structure, perforated sheet metal, or may be a porous plastic structure, but may be any other suitable perforated or porous material configuration known in the art. The annular internal element support core 85 may be permanently attached to the second end cap 82 and formed with the second stage filter element 40 as a single member, may be selectively removable from the second end cap 82, may be unattached and configured in an abutting relationship with second end cap 82, or may be configured spaced apart from the second end cap 82. Additionally, the annular internal element support core 85 may be used in conjunction with any of the other embodiments presently disclosed.

With reference to FIGS. 7-7B, a second embodiment of a multi-stage filter element assembly 10 is illustrated. In the second embodiment, the second end 38 of the first stage filter element 34 is disposed within one of the tubular filter guides 70. With particular reference to FIGS. 7A and 7B, a first ring seal holder 98 and first annular seal 100 surround the first stage filter element 34 proximate its second end 38. The first ring seal holder 98 and first annular seal 100 are disposed between the first stage filter element 34 and the tubular filter guide 70. The first annular seal 100 may be radially deflected and/or compressed between the first stage filter element 34 and the tubular filter guide 70, providing a fluid-tight radial seal. In one embodiment, a second ring seal holder 114 and a second annular seal 116 may surround the second stage filter element 40 proximate its second end 44. The second ring seal holder 114 and the second annular seal 116 may be disposed between and the second annular seal 116 may be radially deflected and/or compressed between the second stage filter element 40 and the tubular filter guide 70, providing a fluid-tight radial seal.

In one embodiment, a ring divider seal end cap 119 is also provided, which may be securely affixed to either one of the filter elements. The ring divider seal end cap 119 encloses the second end 38 of the first stage filter element 34. The second stage filter element 40 extends coaxially with the first stage filter element 34 (with the interiors of the filter elements 34, 40 in fluid communication along the hollow core, as in the previous embodiment). The second end 44 of the second stage filter element 40 abuts the ring divider seal end cap 119 which separates the media of the first stage filter element 34 from that of the second stage filter element 40. The ring divider seal end cap 119 may provide a seal between the filter media of the first stage filter element 34 and the filter media of the second stage filter element 40 while allowing fluid to travel from the interior of the first stage filter element 34 to the interior of the second stage filter element 40.

In one embodiment, the ring divider seal end cap 119 includes an annular (e.g. cylindrical or conical to provide a tapered guide in) guide portion 120 extending transversely from a flat disc portion 121 of the ring divider seal end cap 119. The flat disc portion 121 may be sealingly bonded to the end of the tubular ring of filter media of the first filter element. The annular guide portion 120 is sized and configured to be surrounded by the second stage filter element 40, and to abut against the interior of the second stage filter element 40. The annular guide portion 120 may help to slidably guide the first stage filter element 34 as it is installed into an operative configuration relative to the second stage filter element 40 and may help to maintain the filter elements 34, 40 in alignment and in the operative configuration. The annular guide portion 120 generally lines a portion of the second stage filter element 40. The annular guide portion 120 may be integrally formed with a remainder of the ring divider seal end cap 119 as a single piece. The annular guide portion 120 may be formed from plastic, metal, an elastomer, or any other suitable material.

The ring divider seal end cap 119 may be formed from any suitable type of material, including a plastic molded end cap, a urethane free rise molded end cap, etc. The ring divider seal end cap 119 may be secured to the second end 38 of the first stage filter element 34 by any suitable method, including potting, forming a urethane end cap directly to the filter media or in the case of plastic embedding the plastic into the end of the media (e.g. thermally welding) etc.

In an alternate embodiment, the ring divider seal end cap 119 may instead enclose and couple to the second end 44 of the second stage filter element 40. In this alternate embodiment, the annular guide portion 120 may instead extend upstream from the ring divider seal end cap 119 into the interior of the first stage filter element 34 lining a portion of the second end 38 of the first stage filter element 34.

In an alternate embodiment, the ring divider seal end cap 119, may eliminate the need for a second ring seal holder 114 and second annular seal 116. In this embodiment, the end cap 119 provides a fluid-tight seal between the filter media of the first stage filter element 34 and the filter media of the second stage filter element 40. For example, the material of the seal end cap 119 may be compressibly resilient or carry an annular gasket (or annular seal protrusion that projects into end of filter media ring of the other stage). As such, in one embodiment only a first ring seal holder 98 and first annular seal 100 may be provided.

With reference to FIGS. 7C and 7D, an alternate embodiment of the multi stage-filter element assembly of FIGS. 7-7A is illustrated. In this embodiment, the first ring seal holder 98 and first annular seal 100 along with the ring divider seal end cap 119 provide a fluid tight seal with respect to the second end 38 of the first stage filter element 34. Thus, in this second embodiment, only a single ring seal holder 98 and annular seal 100 are employed to ensure that fluid passes completely through both the first and second stage filter elements 34, 40.

With reference to FIGS. 8-8B, a third embodiment of a multi-stage filter element assembly 10 is illustrated. As in the previous embodiment, a ring divider seal end cap 119a is provided, enclosing the second end 38 of the first stage filter element 34. An annular guide portion 120a extends transversely from a flat annular disc portion 121a of the ring divider seal end cap 119a. The annular guide portion 120a extends along the longitudinal axis downstream into the interior of the second stage filter element 40. In one embodiment, the exterior surface of the guide portion 120a may provided with a first threading structure 122.

The second end 44 of the second stage filter element 40 is provided with an end cap 124 enclosing and that may be sealingly bonded to the second end 44 of the second stage filter element 40 (e.g. at flat disc portion 125). Extending transversely downstream along the longitudinal axis from a disc portion 125 of the end cap 124 is an annular lining portion 126. The annular lining portion 126 is configured to abut against and line a portion of the second end 44 of the second stage filter element 40. The annular lining portion 126 defines a second threaded portion 128 on its radial exterior configured to cooperatively interact with the first threading structure 122 to releasably connect and secure the first stage filter element 34 to the second stage filter element 40 in an operative configuration. With this configuration, the first and second filter elements may be installed and removed as a single unit and assembly.

The first stage filter element 34 may be rotated about the longitudinal axis 96, thereby engaging the first threading structure 122, located radially inwardly of the second threading structure 128 in the operative configuration, with the second threading structure 128 until the end cap 119*a* of the first stage filter element 34 abuts the second end cap 126 of the second filter element 40.

Optionally, an annular seal such as an elastomeric o-ring gasket may be carried by one of the end caps 119*a*, 124 and compressed between the elements during operation providing an axial seal. This can negate the need for the second seal 116 or alternatively the first seal 100. Axial compression may be enhanced by the fact that the high pressure side may cause urge the elements together against the downstream side of the vessel. This axial seal feature may also be used without a connection between elements such as by intermating threads as shown.

Like the first end cap 119*a*, the second end cap 124 may be formed from any suitable type of material, and preferably may be a plastic molded end cap. The second end cap 124 may be secured to the second end 44 of the second stage filter element 40 by any suitable method, including potting, or embedding a plastic end cap directly to the end of the tubular ring of filter media. The annular lining portion 126 may be integrally formed with the second end cap 124 as a single piece.

Various other suitable releasable coupling arrangements between the first stage filter element 34 and the second stage filter element 40 are also envisioned, including various configurations that would allow use of only a single ring seal holder 98, 114 and single ring seal 100, 116 and eliminate the need for a second ring seal holder 98, 114 and second ring seal 100, 116.

As in the embodiment illustrated in FIGS. 7C and 7D, in another embodiment, the first ring seal holder 98 and first ring seal 100 along with the first end cap 119*a* may provide a fluid tight seal of the second end 38 of the first stage filter element 34, and thus, the second ring seal holder 114 and the second ring seal 116 are omitted.

With reference to FIGS. 9-9B, a fourth embodiment of a multi-stage filter element assembly 10 is illustrated. In this embodiment, the mounting post 84 of the first end cap 80 defines a receiving aperture coaxial with the longitudinal axis 96 configured to receive a tie rod 130. In one embodiment the receiving aperture may define threading. The tie rod 130 is received within the receiving aperture, is supported by the mounting post 84, and extends therefrom to a ring divider seal end cap 132 coupled to and enclosing the second stage filter element 40.

The second end 38 of the first stage filter element 34 is enclosed by an annular end cap 134 coupled to the first stage filter element 34 by any suitable means such as adhesive, potting or thermally welding (all which can provide a seal bond). In an operative configuration, the first stage filter element 34 is configured coaxial with and surrounding the tie rod 130 with the annular end cap 134 configured in an abutting relationship with the ring divider seal end cap 132 and forming a fluid-tight seal therebetween.

The ring divider seal end cap 132 is disposed within the tubular filter guide 70 and includes a ring seal receiving channel 136 containing a ring seal 138, which may be a chevron-type seal or any other suitable type of seal. The ring seal 138 may be compressed and forms a fluid-tight seal between the tubular filter guide 70 and the ring divider seal end cap 132. The ring divider seal end cap 132 may thus be removably held in an operative configuration within the tubular filter guide 70.

With reference to FIGS. 9A and 9B, the ring divider seal end cap 132 includes a pair of annular guide portions 140, 142 (that may be cylindrical or slightly conical to provide tapered guide surfaces) extending transversely upstream and downstream respectively therefrom. The first annular guide portion 140 extends upstream from the ring divider seal end cap 132 lining the interior portion of the second end 38 of the first stage filter element 34 and the annular end cap 132. The ring divider seal end cap 132 thus may act as a guide to receive, support, and locate the second end 38 of the first stage filter element 34 relative to the ring divider seal end cap 132 and the second stage filter element 40, as the first stage filter element 34 may be slidably displaced onto the first annular guide portion 140. The first stage filter element 34 may be easily slidably displaced off of the first annular guide portion 140 for replacement with another first stage filter element 34, which may in turn be easily slidably displaced onto the first annular guide portion 140.

The second annular guide portion 142 extends upstream from the ring divider seal end cap 132 into the interior of the second stage filter element 40. The second annular guide portion 142 lines a portion of the interior of the second end 44 of the second stage filter element 40 supporting the second stage filter element 40 around the longitudinal axis 96 and maintaining the interior of the second stage filter element 40 in fluid communication with the interior of the first stage filter element 34.

In the illustrated embodiment, the ring divider seal end cap 132 is an annular end cap creating a fluid tight seal on the second end 44 of the second stage filter element 40, while allowing fluid to flow from the interior of the first stage filter element 34 to the interior of the second stage filter element 40. The ring divider seal end cap 132 may be formed from plastic, an elastomer, or any other suitable material. The ring seal 138 may be formed from an elastomer or any other suitable material capable of maintaining the ring divider seal end cap 132 in place with respect to the tubular filter guide 70 and maintaining a fluid-tight seal.

With further reference to FIG. 9B, the ring divider seal end cap 132 includes a plurality of radially inwardly extending spokes 144 which extend inwardly and meet at an annular hub 135. The annular hub 135 defines threading on its interior wall configured to cooperatively interact with the threading of the tie rod 130. The center threaded portion 146 is configured to releasably cooperatively engage with the tie rod 130 to secure it. The tie rod 130 may, for example, include threading configured to cooperatively engage the ring divider seal end cap 132. The tie rod 130 may threadingly interact with the ring divider seal end cap 132 in an operative configuration to urge the first stage filter element 34 towards and hold the first stage filter element 34 in an operative configuration with the ring divider seal end cap 132. Additionally, the ring divider seal end cap 132 may interface with the tie rod 130 in any other suitable manner.

An alternate end cap configuration is illustrated in FIGS. 10 and 11. In the alternate embodiment, the alternate first end cap 148 has a greater diameter than the first stage filter element 34 and includes an outer annular axially projecting portion 150 around its periphery. The end cap 148 receives the tie rod 130 through its center and includes an axially projecting center portion 152 which projects into the hollow core of the first stage filter element 34. The axially projecting center portion 152 in one embodiment may have a diameter D no larger than the inner diameter of the first stage filter element 34 axially proximate the end cap 148, may provide radial support for the first stage filter element 34 and may serve to center the first stage filter element 34. The end cap 148 also defines an annular axial projection 154 located radially outwardly from the projecting center portion 152 but radially inwardly from the outer annular axially projecting portion 150. The outer annular axially projecting portion 150 and the annular axial projection 154 may be compressed into the first stage filter element 34 to prevent the fluid from escaping from within the first stage filter element 34 and to ensure that the fluid passes entirely through the first stage filter element 34.

The end cap 148 may be removed from the tie rod 130 by rotating the end cap 148 about the longitudinal axis 96. The first stage filter element 34 may then be slidably placed over the tie rod 130. The end cap 148 may then be threadably rotated about the longitudinal axis 96 onto the tie rod 130 until the annular center portion 152 is located within the hollow core of the first stage filter element 34 and the first stage filter element 34 is compressed against the outer annular axially projecting portion 150 and the annular axial projection 150.

Various other suitable end cap configurations are also envisioned.

With reference to FIGS. 12 and 12A, a fifth embodiment of a multi-stage filter element assembly 10 is illustrated. In this embodiment a prefilter is provide at the first stage, providing two stages of filtering at the upstream side, and thereby three stages of filtering overall (e.g. three stages means at least three stages in that further prefilters or stages for additional capacity could be provided). In this embodiment, an inner filter element 156 (which may be a single long filter element providing two stages) extends from the first end cap 80 through the first stage 26 through the tubular filter guide 70 into the impingement baffle 74 through the second stage 30 to the second end cap 82. A ring seal holder 98 holding a chevron-type or other suitable type of ring seal 100 surrounds the inner filter element 156 and is positioned between the tubular filter guide 70 and the inner filter element 156, creating a fluid-tight seal therebetween.

An outer prefilter sleeve element 158 is also provided. The outer filter element 158 surrounds the inner filter element 156 in the first stage 26 and extends coaxially with the inner filter element 156 from the first end cap 80 to the ring seal holder 98. Typically the prefilter sleeve element 158 will be a more open, less restrictive and less efficient filter media than the filter media of the inner filter element 156. Thus, little pressure drop is expected across the prefilter element, typically only about 0.1 to 0.2 PSI, while configured with an efficiency to capture larger particles that are between one micron and 50 microns in size.

Thus, in this embodiment, fluid passing through the first stage 26 will pass through the outer prefilter sleeve element 158, then through the inner filter element 156 into the interior of the inner element 156. The fluid, thus having undergone two steps of filtering in the first stage 26, will pass through the first stage 26 in the interior of the inner element 156 through the tubular filter guide 70 and pass outwardly through the inner element 156 into the second stage 30 in a third filtration step. Thus, the fluid will have undergone a three-step filtering process. The first stage may be a prefilter for larger particles only, while the remaining two stages can provide depth filtration for smaller particles. The second and third stages may have equal filtration parameters, as is the case with a single continuous inner element as shown. Advantageously, the prefilter need only to extend a part of the length of the inner filter element and can increase lifespan of the inner filter element by capturing larger particles and without prematurely clogging or causing restriction due to the lower efficiency and more open media. In one embodiment the addition of the outer prefilter sleeve element 158 will add a third level of coalescing to the system to increase liquid removal capability.

Moreover, the outer prefilter sleeve element 158 may be of a different porosity and density, and may have various other differing qualities, than the inner filter element 156. In one embodiment, the outer prefilter sleeve 158 may be of a significantly larger porosity than the inner filter element 156 and may be configured to remove large contaminants from the fluid.

The outer prefilter sleeve element 158 may also be used in combination with any of the other embodiments disclosed above, thus providing three or more different stages of filtration. In such examples, preferably the last stage will be the most efficient with the tightest pore sizes in the media. In other embodiments, an outer filter sleeve element 158 may be provided surrounding the first stage filter element 34 to again provide a three step filtering apparatus. As in the embodiment illustrated in FIG. 12, the prefilter sleeve element 158 may extend over the first stage filter elements through at least a portion of the first stage 26. Additionally, each of the first stage filter element 34, the second stage filter element 40, and the filter sleeve element 158 may be of similar or dissimilar types of filter elements formed from similar or dissimilar materials and have different porosities, densities, etc. This may provide for flexibility in filtering various different impurities from various fluids.

Additionally, in another embodiment, an additional outer filter sleeve element 158 may be provided in surrounding relation with the second stage filter element 40. Similarly, the additional outer filter sleeve element 158 may be used in the second stage 30 in an embodiment having a single inner filter element 156, or first stage and second stage filter elements 34, 40. It is also contemplated that a first outer filter sleeve element 158 could be provided surrounding the filter element provided in a first stage and a second outer filter sleeve element could be provided surround the filter element provided in a second stage. Moreover, it is contemplated that a single outer filter sleeve may extend through both the first and second stages surrounding the filter element or elements disposed therein. The additional outer filter sleeve elements may be of any suitable type, such as, for example, pleated or barrier.

With reference to FIGS. 13-13B, an embodiment including an alternate ring divider seal end cap 132a is illustrated. The ring divider seal end cap 132a includes a pair of annular guide portions 140a, 142a (that may be cylindrical or slightly conical to provide tapered guide surfaces) extending transversely upstream and downstream respectively therefrom.

The ring divider seal end cap 132a is disposed within the tubular filter guide 70 and includes a ring seal receiving channel 136a containing a ring seal 138a, which may be a chevron-type seal or any other suitable type of seal. The ring seal 138a may be radially deflected and/or compressed and forms a fluid-tight radial seal between the tubular filter guide 70 and the ring divider seal end cap 132a. The ring divider seal end cap 132a may thus be removably held in an operative configuration within the tubular filter guide 70.

In this embodiment, the ring divider seal end cap 132a includes an annular axial gasket 174 installed in an annular receiving groove 170. A radially outwardly projecting stepped portion 172 forms an upstream wall of the groove 172. The axial gasket 174 is disposed and retained within the groove 170 abutting the outwardly projecting stepped portion 172. In an assembled configuration, the axial gasket 174 abuts the upstream terminating edge of the tubular filter guide 70 and, with the stepped portion 172, forms a fluid tight axial seal with the tubular filter guide 70, preventing fluid flow around the divider seal end cap 132a and into the tubular filter guide 70.

In one embodiment of a multi-stage filter element assembly, a tubular filter guide may be flared outwardly at its upstream end. Thus, the gasket 170 and outwardly projecting stepped portion 172 configuration will provide a fluid tight seal with such a flared tubular filter guide.

As in the previous embodiment illustrated in FIG. 9, the first annular guide portion 140a extends upstream from the ring divider seal end cap 132a lining the interior portion of the second end 38 of the first stage filter element 34 and the annular end cap 132. The ring divider seal end cap 132a thus may act as a guide to receive, support, and locate the second end 38 of the first stage filter element 34 relative to the ring divider seal end cap 132a and the second stage filter element 40, as the first stage filter element 34 may be slidably displaced onto the first annular guide portion 140a. The first stage filter element 34 may be easily slidably displaced off of the first annular guide portion 140a for replacement with another first stage filter element 34, which may in turn be easily slidably displaced onto the first annular guide portion 140a. The second annular guide portion 142a extends upstream from the ring divider seal end cap 132a into the interior of the second stage filter element 40. The second annular guide portion 142a lines a portion of the interior of the second end 44 of the second stage filter element 40 supporting the second stage filter element 40 around the longitudinal axis 96 and maintaining the interior of the second stage filter element 40 in fluid communication with the interior of the first stage filter element 34.

As in the previous embodiment, the ring divider seal end cap 132a is an annular end cap creating a fluid tight seal on the second end 44 of the second stage filter element 40, while allowing fluid to flow from the interior of the first stage filter element 34 to the interior of the second stage filter element 40. The ring divider seal end cap 132a may be formed from plastic, an elastomer, or any other suitable material. The ring seal 138a may be formed from an elastomer or any other suitable material capable of maintaining the ring divider seal end cap 132a in place with respect to the tubular filter guide 70 and maintaining a fluid-tight seal.

With reference to FIG. 13B, as in the previous embodiment, the ring divider seal end cap 132a includes a plurality of radially inwardly extending spokes 144a which extend inwardly and meet at an annular hub 135a. The annular hub 135a defines threading on its interior wall configured to cooperatively interact with the threading of the tie rod 130. The center threaded portion 146a is configured to releasably cooperatively engage with the tie rod 130 to secure it. The tie rod 130 may, for example, include threading configured to cooperatively engage the ring divider seal end cap 132a. The tie rod 130 may threadingly interact with the ring divider seal end cap 132a in an operative configuration to urge the first stage filter element 34 towards and hold the first stage filter element 34 in an operative configuration with the ring divider seal end cap 132a. Additionally, the ring divider seal end cap 132a may interface with the tie rod 130 in any other suitable manner.

With reference to FIGS. 14 and 14A, a seventh embodiment of a multi-stage filter element assembly is illustrated. In this embodiment, the second end 38 of the first stage filter element 34 is axially sealed by a first annular divider ring seal 190. The second end 38 of the first stage filter element 34 is coupled to the first annual divider ring seal 190 by potting or by any other suitable method, with the first annular divider ring seal 190 creating a fluid tight axial seal over the end of the first stage filter element 34 while allowing fluid passage through the interior of the first stage filter element 34 to the interior of the second stage filter element 40. The first annular divider ring seal 190 includes a radially extending portion 192 axially sealing and projecting radially outwardly from the first stage filter element 34 and an axially extending flange portion 194 extending axially upstream from the radially extending portion 192 radially outwardly of the first stage filter element 34. The first annular divider ring seal 190 also defines a step portion 196 radially outwardly of the first stage filter element 34 and proximate the second stage filter element 40.

The second end 44 of the second stage filter element 40 is axially sealed by a second annular divider ring seal 198. The second end 44 of the second stage filter element 40 is coupled to the second annular divider ring seal 198 by potting or by an other suitable method, with the second annular divider ring seal 198 creating a fluid tight axial seal over the end of the second stage filter element 40 while allowing fluid passage from the interior of the first stage filter element 40 into the interior of the second stage filter element 40. The second annular divider ring seal 198 includes a radially extending portion 200 axially sealing and projecting radially outwardly from the second stage filter element 40 and an axially extending flange portion 202 extending axially downstream from the radially extending portion 200 radially outwardly of the second stage filter element 40. The second annular divider ring seal 198 also defines a step portion 204 radially outwardly of the second stage filter element 40 and proximate the first stage filter element 34.

Thus, the first and second annular divider ring seals 190, 198 each provide axial sealing of the first and second stage filter elements 34, 40. In one embodiment, the first and second annular divider ring seals 190, 198 are formed from plastic. In other embodiments, the first and second annular divider ring seals may be formed from any other suitable material known in the art.

The radially extending portions 192, 200 of the first and second annular divider ring seals 190, 198 are coupled together using adhesive, heat bonding, spin-welding or by any other suitable method for permanently or semi-permanently joining, thus joining the first and second filter elements into a single length filter element. Thus, the coupled filter elements 34, 40 may be inserted or removed as a single piece.

The step portions 196, 204 of the first and second annular divider ring seals 190, 198 are opposed and face one another such that when the first and second annular divider ring seals 190, 198 are joined, the step portions 196, 204 form between them and each define half of an annular seal receiving notch 206 in which an annular chevron seal 208 is seated. The annular chevron seal 208 radially deflects or compresses to form a fluid tight radial seal between the first and second annular divider ring seals 190, 198 and the tubular filter guide 70. The annular chevron seal 208 may be formed from an elastomer or any other suitable material.

The multi-stage vessel described herein is merely exemplary. The multi-stage filter element assembly embodiments described may be used in various different suitable applications. Additionally, although the multi-stage vessel has been shown in a generally horizontal configuration, it should be apparent that the multi-stage vessel may be configured in a generally vertical embodiment with the inlet portion located on the lower end and the outlet port located on the upper end.

For example, embodiments of multi-stage filter element assemblies in accordance with the present invention may be used, for example, in coalescers such as those marketed by Perry Equipment Company of Mineral Wells, Tex., under the mark Gemini Purasep. Additionally, it is envisioned that embodiments of multi-stage filter element assemblies in accordance with the present invention may be used in conjunction with various other apparatuses in various filtering, separating, coalescing, and other suitable applications.

Various suitable materials for forming various multi-stage filter element assembly embodiments are described above. In one embodiment, a multi-stage filter element assembly may be formed without the use of any metal parts.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element assembly having at least three stages, for a pressure vessel having a tube sheet with a plurality of openings, the filter element assembly comprising:

at least one internal filter element adapted to be installed through one of the openings, a seal member mounted to the at least one internal filter element and disposed between ends of the filter element assembly positioned for sealing against the tube sheet, the at least one internal filter element providing for two stages of filtration with a flow passage upstream of the seal member radially through filter media into a central passage and then another stage radially outward through the media downstream of the seal;

a prefilter element surrounding the at least one internal filter element upstream of the seal to provide a prefilter stage upstream of the at least one internal filter element;

an end cap mounted to an end of the at least one internal filter element;

wherein an innermost diameter of the prefilter element is large enough to surround an outermost diameter of the end cap with an annular gap between the at least one internal filter element and the prefilter element, the annular gap defined by said innermost diameter of the prefilter element and the internal filter element; and wherein the prefilter element extends only a partial longitudinal length of the at least one internal filter element.

2. The filter element assembly of claim 1, wherein the at least one internal filter element comprises a full length continuous tube of filter media extending longitudinally on both sides of the seal member, the prefilter element extending only a partial longitudinal length of the full length continuous tube.

3. The filter element assembly of claim 2, wherein the at least one internal filter element comprises at least two filter elements in abutting relation proximate the seal member including an upstream element generally on the upstream side of the seal member and a downstream element generally on the downstream side of the seal member, wherein the prefilter element surrounds the upstream element with the downstream element generally not surrounded by the prefilter element.

4. The filter element of claim 1, wherein the seal member is a radial seal adapted to radially seal against the tube sheet.

5. The filter element of claim 4, wherein the radial seal is a pressure actuated seal and includes a pressure actuated flange adapted to be pressed by higher upstream pressure into tighter radial seal relationship when in use.

6. The filter element assembly of claim 1, wherein the prefilter element covers and only covers a first one of the two stages of filtration to provide a third prefilter stage.

7. The filter element assembly of claim 1, wherein the seal member is contained in a seal holder, the seal holder interposed radially between the at least one internal filter and the seal member, wherein the prefilter element has an axial end proximate the seal holder.

8. The filter element assembly of claim 7, wherein the axial end is axially abutting the seal holder.

9. The filter element assembly of claim 1, wherein the end cap comprises two end caps, wherein the seal member is axially spaced from the end caps and positioned between the two end caps, the prefilter element extending from one of the two end caps to the seal member.

10. The filter element assembly of claim 8, wherein the two end caps each include an end plate and a locating projection, each locating projecting outwardly axially away from the at least one internal filter, each end plate sealingly attached to opposed axial ends of the at least one internal filter.

11. The filter element assembly of claim 8, wherein the two end caps each include an end plate and a locating projection, wherein the prefilter element defines a larger diameter than the end plate of a first one of the two end caps located at a first upstream stage.

12. The filter element assembly of claim 11, wherein the at least one internal filter element axially abuts the end plate of the first one of the two end caps located at the first upstream stage, and wherein the the prefilter element surrounds the end plate of the first one of the two end caps located at the first upstream stage.

13. The filter element assembly of claim 1, wherein the at least one internal filter element comprises a multiple layers of filter media material, and wherein the prefilter element comprises multiple layers of filter media material.

14. The filter element assembly of claim 1, wherein the at least one internal filter element and the prefilter element each comprise non-pleated tubes of filter material.

15. The filter element assembly of claim 1, wherein the prefilter element is configured with a porosity to capture particle sizes between 1 and 50 micron, the at least one internal filter element being more restrictive and more efficient than the prefilter element.

16. The filter element assembly of claim 1, wherein the filter element assembly has a first outermost filter media diameter upstream of the seal member defined by the prefilter element and a second outermost filter media diameter downstream of the seal defined by the at least one internal filter element, wherein the prefilter element does not extend downstream of the seal member to provide only 3 stages of filtration in the filter element assembly.

17. The filter element assembly of claim 1, wherein the at least one filter element comprises first and second axially abutting filter elements, the prefilter element covering only one of the first and second axially abutting filter elements.

18. A multiple stage filtration vessel including the filter element assembly of claim 1, comprising:
    a closed vessel having a longitudinally extending length having an initially open interior, an inlet at an extent and an outlet at an opposite extent thereof;
    a partition located within the vessel interior, the partition dividing the vessel interior into a first stage and a second stage,
    a generally cylindrical guide defining an opening in the partition;
    the filter element assembly extending through the opening, the filter element assembly having a hollow core wherein flow passage through the multiple stage filtration vessel is provided whereby a fluid stream flows into the first stage through the inlet, into and through the hollow core of the filter element assembly back out through the filter element assembly into the second stage to the outlet; the filter element assembly comprising:
    an inner filter media tube and an outer filter media sleeve at the first stage, the outer filter media sleeve surrounding the partial longitudinal length of the inner filter media tube, the outer filter media sleeve being more open and porous than the inner filter media tube; wherein the outer filter media sleeve is the prefilter element and the inner filter media tube provides the at least one internal filter element.

19. The multiple stage filtration vessel of claim 18, wherein at least one of the outer filter media sleeve and the inner filter media tube is a pleated filter member.

20. The multiple stage filtration vessel of claim 18, wherein the inner filter media tube and the outer filter media sleeve each comprise non-pleated depth filtration medias having a radial thickness of at least 0.20 inches.

21. The multiple stage filtration vessel of claim 18, wherein the inner filter media tube extends a full length of a filtration chamber within the open interior between the extents, wherein the outer filter media sleeve extends a partial length only to the partition, and wherein the multiple stage filtration vessel also includes a seal sealing the filter element assembly to the generally cylindrical guide.

22. The multiple stage filtration vessel of claim 18, wherein the filter element assembly includes a second filter media tube when assembled with the inner filter media tube, the second filter media tube adapted to axially abut the inner filter media tube with an internal flow passage therebetween.

* * * * *

UNITED STATES PATENT AND TRADEMARK OFFICE
CERTIFICATE OF CORRECTION

PATENT NO. : 8,936,661 B2
APPLICATION NO. : 13/033105
DATED : January 20, 2015
INVENTOR(S) : David J. Burns et al.

Page 1 of 1

It is certified that error appears in the above-identified patent and that said Letters Patent is hereby corrected as shown below:

In the Claims
Column 22, line 9, claim 1, --filter-- should be inserted after --through the--

Column 22, line 61, claim 10, replace --8-- with --9--

Column 22, line 66, claim 11, replace --8-- with --9--

Signed and Sealed this
Nineteenth Day of May, 2015

Michelle K. Lee
*Director of the United States Patent and Trademark Office*